(12) United States Patent
Takeuchi

(10) Patent No.: US 7,730,100 B2
(45) Date of Patent: Jun. 1, 2010

(54) INFORMATION PROCESSING APPARATUS, INFORMATION PROCESSING METHOD, AND STORAGE MEDIUM

(75) Inventor: Tomoyuki Takeuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 11/559,085

(22) Filed: Nov. 13, 2006

(65) Prior Publication Data
US 2007/0112769 A1 May 17, 2007

(30) Foreign Application Priority Data
Nov. 14, 2005 (JP) ............................. 2005-328482

(51) Int. Cl.
*G06F 17/30* (2006.01)
(52) U.S. Cl. .................. 707/796; 707/688; 707/692; 707/720; 707/740; 707/754
(58) Field of Classification Search ................ 707/688, 707/692, 720, 754, 796
See application file for complete search history.

(56) References Cited

U.S. PATENT DOCUMENTS

| | | | | |
|---|---|---|---|---|
| 5,519,865 A * | 5/1996 | Kondo et al. | ................... | 707/1 |
| 5,872,865 A * | 2/1999 | Normile et al. | ............. | 382/224 |
| 5,946,683 A * | 8/1999 | Rastogi et al. | .................. | 707/6 |
| 6,009,439 A * | 12/1999 | Shiomi et al. | ............. | 707/104.1 |
| 6,032,146 A * | 2/2000 | Chadha et al. | ..................... | 1/1 |
| 6,072,941 A * | 6/2000 | Suzuki et al. | ................. | 358/1.9 |
| 6,460,049 B1 * | 10/2002 | Becker et al. | ............ | 707/104.1 |
| 6,505,195 B1 * | 1/2003 | Ikeda et al. | ..................... | 707/3 |
| 6,701,311 B2 * | 3/2004 | Biebesheimer et al. | ............. | 1/1 |
| 6,826,724 B1 * | 11/2004 | Shimada et al. | ............. | 715/234 |
| 6,853,998 B2 * | 2/2005 | Biebesheimer et al. | ............. | 1/1 |
| 7,083,091 B2 * | 8/2006 | Ishikawa et al. | ............ | 235/383 |
| 7,219,099 B2 * | 5/2007 | Kuntala et al. | ..................... | 1/1 |
| 7,231,386 B2 * | 6/2007 | Nonomura et al. | ............. | 707/3 |
| 7,337,166 B2 * | 2/2008 | Bailey et al. | ........................ | 1/1 |
| 7,359,905 B2 * | 4/2008 | Tunning et al. | ............. | 707/100 |
| 7,363,296 B1 * | 4/2008 | Naam et al. | ......................... | 1/1 |
| 7,363,309 B1 * | 4/2008 | Waite et al. | ................. | 707/101 |
| 7,451,155 B2 * | 11/2008 | Slackman et al. | ................... | 1/1 |
| 7,512,626 B2 * | 3/2009 | Chitgupakar et al. | ................ | 1/1 |
| 2001/0044759 A1 * | 11/2001 | Kutsumi et al. | ............... | 705/27 |
| 2002/0049720 A1 * | 4/2002 | Schmidt | ........................ | 707/1 |

(Continued)

FOREIGN PATENT DOCUMENTS

JP 10-187739 A 7/1998

OTHER PUBLICATIONS

Wold et al., "Content-Based Classification, Search and Retrieval of Audio", IEEE Multimedia, IEEE Computer Society, vol. 3, No. 3, 1996, pp. 27-36.*

*Primary Examiner*—Apu M Mofiz
*Assistant Examiner*—Hung D Le
(74) *Attorney, Agent, or Firm*—Canon U.S.A., Inc. I.P. Division

(57) ABSTRACT

An information processing apparatus for searching for a desired content from a storage unit storing a plurality of contents to which a plurality of attributes is set classifies stored contents by each of the attributes. The information processing apparatus then counts the number of registered contents classified by each of the attributes and determines an attribute as a criterion for classifying contents.

13 Claims, 21 Drawing Sheets

U.S. PATENT DOCUMENTS

2002/0143742 A1* 10/2002 Nonomura et al. ............. 707/1
2005/0114399 A1* 5/2005 Hosoi ...................... 707/104.1
2006/0106847 A1* 5/2006 Eckardt et al. ............. 707/101
2007/0073686 A1* 3/2007 Brooks et al. ................. 707/6
2007/0078873 A1* 4/2007 Avinash et al. .............. 707/101
2007/0162473 A1* 7/2007 Hadzikadic et al. ......... 707/100
2007/0220055 A1* 9/2007 Gong et al. ................. 707/200
2008/0027909 A1* 1/2008 Gang et al. .................... 707/3

* cited by examiner

| ATTRIBUTE | FILE FORMAT | COLOR DESCRIPTION | CREATOR | DETAIL OF CONTENT | |
|---|---|---|---|---|---|
| ATTRIBUTE VALUE/ NUMBER OF CONTENTS | BMP / 30<br>JPG / 40<br>GIF / 30 | MONOCHROME / 15<br>GRAYSCALE / 25<br>FULL-COLOR / 60 | A / 10<br>B / 48<br>C / 21<br>D / 6<br>E / 15 | LOGO / 3<br>LANDSCAPE / 18<br>PRODUCT SAMPLE / 25<br>MAP / 10<br>... | ~605 |
| MAXIMUM NUMBER OF CONTENTS | 40 | 60 | 48 | 25 | ~606 |
| NUMBER OF CLASSIFICATIONS | 3 | 3 | 5 | 12 | ~607 |

BMP

| ATTRIBUTE | COLOR DESCRIPTION | CREATOR | DETAIL OF CONTENT |
|---|---|---|---|
| ATTRIBUTE VALUE/ NUMBER OF CONTENTS | MONOCHROME / 10 FULL-COLOR / 20 | B / 30 | PRODUCT SAMPLE / 23 ORGANIZATION CHART / 5 SCHEMATIC DIAGRAM / 1 OTHERS / 1 |
| MAXIMUM NUMBER OF CONTENTS | 20 | 30 | 23 |
| NUMBER OF CLASSIFICATIONS | 2 | 1 | 4 |

JPG

| ATTRIBUTE | COLOR DESCRIPTION | CREATOR | DETAIL OF CONTENT |
|---|---|---|---|
| ATTRIBUTE VALUE/ NUMBER OF CONTENTS | GRAYSCALE / 19 FULL-COLOR / 21 | A / 9 B / 18 C / 21 | LOGO / 1 LANDSCAPE / 18 PRODUCT SAMPLE / 2 CAPITAL ASSET / 4 ... |
| MAXIMUM NUMBER OF CONTENTS | 21 | 21 | 13 |
| NUMBER OF CLASSIFICATIONS | 2 | 3 | 7 |

GIF

| ATTRIBUTE | COLOR DESCRIPTION | CREATOR | DETAIL OF CONTENT |
|---|---|---|---|
| ATTRIBUTE VALUE/ NUMBER OF CONTENTS | MONOCHROME / 5 GRAYSCALE / 6 FULL-COLOR / 19 | A / 1 D / 6 E / 15 | LOGO / 2 MAP / 10 ICON / 13 SCHEMATIC DIAGRAM / 5 |
| MAXIMUM NUMBER OF CONTENTS | 19 | 15 | 13 |
| NUMBER OF CLASSIFICATIONS | 3 | 3 | 4 |

| ATTRIBUTE | COLOR DESCRIPTION | CREATOR | DETAIL OF CONTENT |
|---|---|---|---|
| MAXIMUM NUMBER OF CONTENTS | 21 | 30 | 23 |
| NUMBER OF CLASSIFICATIONS | 3 | 3 | 7 |

FIG.17

| ATTRIBUTE | FILE FORMAT | COLOR DESCRIPTION | CREATOR | DETAIL OF CONTENT |
|---|---|---|---|---|
| | 601 | 602 | 603 | 604 |
| PRIORITY | 50 | 20 | 30 | 100 |

FIG.18

| ATTRIBUTE | FILE FORMAT | COLOR DESCRIPTION | CREATOR |
|---|---|---|---|
| | 601 | 602 | 603 |
| MAXIMUM NUMBER OF CONTENTS | 40 | 60 | 48 |
| PRIORITY | 50 | 20 | 30 |
| CLASSIFICATION COST | 0.80 | 3.00 | 1.60 |

FIG.19

| ATTRIBUTE | COLOR DESCRIPTION | CREATOR | DETAIL OF CONTENT |
|---|---|---|---|
| | 602 | 603 | 604 |
| MAXIMUM NUMBER OF CONTENTS | 19 | 15 | 13 |
| PRIORITY | 20 | 30 | 100 |
| CLASSIFICATION COST | 0.95 | 0.50 | 0.13 |

| ATTRIBUTE | FILE FORMAT * COLOR DESCRIPTION (2301) | FILE FORMAT * CREATOR (2302) |
|---|---|---|
| ATTRIBUTE VALUE/ NUMBER OF CONTENTS | BMP * MONOCHROME / 10<br>BMP * FULL-COLOR / 20<br>JPG * GRAYSCALE / 19<br>JPG * FULL-COLOR / 21<br>... | BMP * B / 30<br>JPG * A / 9<br>JPG * B / 18<br>JPG * C / 21<br>... |
| MAXIMUM NUMBER OF CONTENTS | 21 | 30 |
| NUMBER OF CLASSIFICATIONS | 7 | 7 |

STORAGE MEDIUM SUCH AS FD OR CD-ROM

| DIRECTORY INFORMATION |
| --- |
| PROGRAM CODE CORRESPONDING TO STEPS IN FLOWCHART OF FIG. 3 |
| PROGRAM CODE CORRESPONDING TO STEPS IN FLOWCHART OF FIG. 4 |
| PROGRAM CODE CORRESPONDING TO STEPS IN FLOWCHART OF FIG. 5 |
| PROGRAM CODE CORRESPONDING TO STEPS IN FLOWCHART OF FIG. 15 |
| PROGRAM CODE CORRESPONDING TO STEPS IN FLOWCHART OF FIG. 16 |
| PROGRAM CODE CORRESPONDING TO STEPS IN FLOWCHART OF FIG. 22 |
|   |

MEMORY MAP IN STORAGE MEDIUM

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, an information processing method, and a storage medium for searching for desired content having a given attribute.

2. Description of the Related Art

Conventionally, a system which stores a large amount of electronic content (e.g. documents, images, etc.) in a storage device and allows reuse of such content has been proposed. In such a system, a search function for searching for content in the storage device is essential.

One way to realize such a function of searching for content is to classify contents using attribute values associated with the contents. In this case, the system lists the attribute values in the same order as the attributes by which the contents are classified. The list of the attribute values is displayed in a display device of an information processing apparatus in the system for a user to see. The user selects an attribute value from the list to instruct the system to refine search on the contents. The user can reach the desired content by repeating this operation for several attributes. For example, in the case where a user is looking for a leasehold property, the user selects various attribute values such as rent, age, nearest station, room arrangement, and accommodation of a wooden floor, self-locking door, and cable television a number of times. The search process is conducted so that the user can reach the desired property.

In addition, Japanese Patent Application Laid-Open No. 10-187739 discusses a method of refining a search by providing a user with questions and a choice of answers in a particular order to conduct search refinement effectively. The search result is refined based on the answer selected by the user from the choice of answers.

However, in the search systems described above, the number of attribute values that are candidates in one selection and the efficiency of the refinement will differ if the order of attributes shown to the user differs. In addition, depending on the order of attributes shown to a user, the number of attribute values to be chosen becomes too large and the selection takes time. The number of times of search refinement to reach the desired content can also increase due to low efficiency of the refinement.

SUMMARY OF THE INVENTION

The present invention is directed to an information processing apparatus which provides a user with a structure to select from attribute values classified into a reasonable number to refine search on contents efficiently to access a desired content. In addition, the present invention is directed to an information processing apparatus which provides a content manager with a system which automatically classifies the contents in order to refine a search efficiently.

According to an aspect of the present invention, an information processing apparatus configured to classify a plurality of contents to which a plurality of attributes is set includes a first classification unit configured to count number of classifications and number of contents of each classification in a case where a plurality of contents stored in a storage unit is classified by each of the attributes, and a first determining unit configured to determine an attribute as a criterion for classifying contents based on the number of classifications and the number of contents counted by the first classification unit.

According to another aspect of the present invention, an information processing method for classifying a plurality of contents to which a plurality of attributes is set includes counting number of classifications and number of contents of each classification in a case where a plurality of contents stored in a storage unit is classified by each of the attributes, and determining an attribute as a criterion for classifying contents based on the number of classifications and the number of contents counted.

According to an exemplary embodiment of the present invention, a user can access the desired content through efficient search refinement by selecting from attribute values classified into a reasonable number. In addition, a content manager can automatically classify contents for an efficient search refinement.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an example of a result of counting contents in the information processing apparatus according to an exemplary embodiment of the present invention.

FIG. 17 illustrates an example of a table of attributes and the corresponding priority stored on a hard disk shown in FIG. 2.

FIG. 18 illustrates an example of a table of classification cost calculated by the information processing apparatus according to an exemplary embodiment of the present invention.

FIG. 19 illustrates an example of a table of classification cost calculated by the information processing apparatus according to an exemplary embodiment of the present invention.

FIG. 26 is a memory map of a storage medium which stores various data processing programs that can be read by the information processing apparatus according to an exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
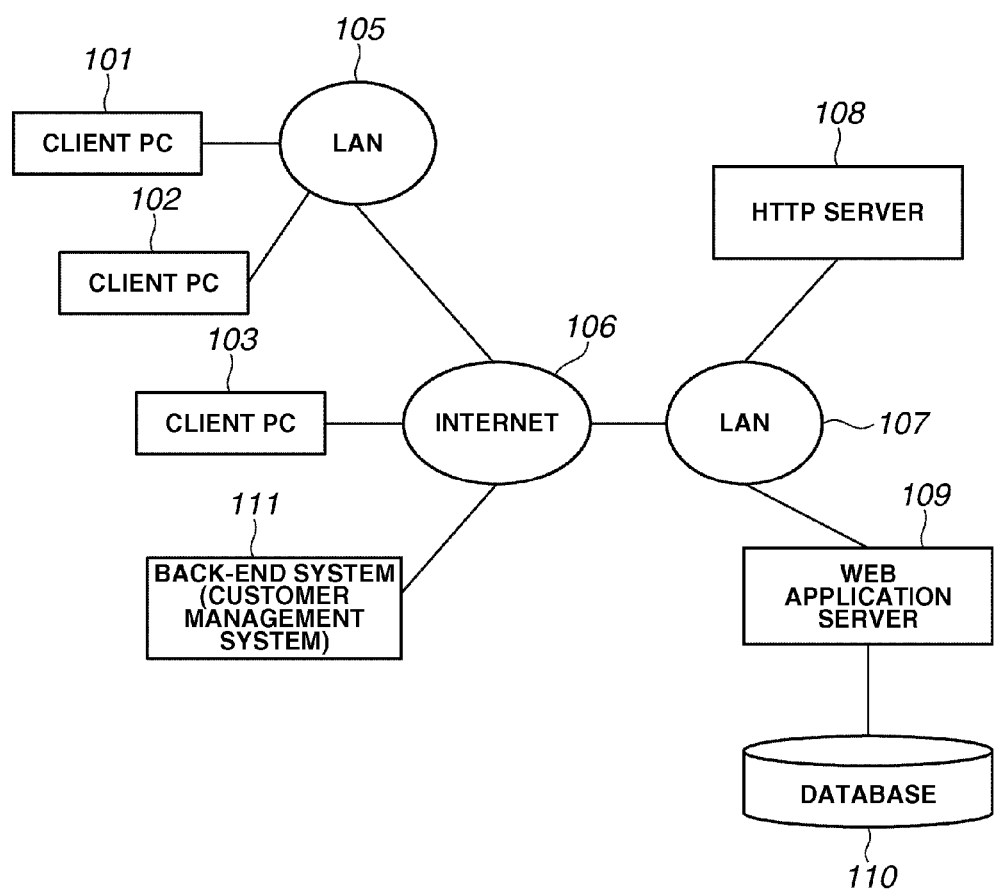
FIG. 1 is a block diagram illustrating an example of an information processing system according to a first exemplary embodiment of the present invention.

FIG. 1 illustrates an example of an information processing system including an information processing apparatus according to a first exemplary embodiment of the present invention. This system is used to view various contents.

In the present exemplary embodiment, "content" refers to document data, image data, text data, music data, video data, and other electronic data which can be handled by an information processing apparatus. Content varies according to the attribute of an actual system to be operated. For example, in a music distribution system, content is mainly a music file and document data accompanying the file. In a catalog creation system, content is image data and text data.

As shown in FIG. 1, the information processing system includes client PCs 101, 102, and 103, an HTTP server (or a web server) 108, and a web application server (WAS) 109 on a network.

The client PCs 101, 102, and 103 are computers that use a web browser, communicate by HTTP, and are used, for example, by a system manager to maintain content or maintain the system such as correct user management information.

Local area networks (LANs) 105 and 107 and the Internet 106 are networks used in the system. The client PCs 101 and 102 are connected to the LAN 105 and exchange data with the other devices through the LAN 105. The client PC 103 is directly connected to the Internet 106.

The HTTP server (web server) 108 receives requests from the client PCs 101, 102, and 103 sent using HTTP through the network. In accordance with the content of the request, the HTTP server 108 assigns a process to an appropriate web application server among a number of registered web application servers, such as the web application server 109. Upon receiving the request, the web application server 109 executes a process and returns the result to the client PCs 101, 102, and 103.

The web application server 109 is connected to a database 110, in which content data, data associated with the content, operation history, process status, and system information such as user and group information, are recorded. The HTTP server 108, the web application server 109, and the database 110 are combined to function as a web database system.

In addition, the web application server 109 can be in communication with a back-end system (or a customer management system) 111 through the LAN 107, realizing a structure in which content can be used at the back-end system 111. The back-end system 111 can also be directly connected to the web application server 109.

Figure 2:
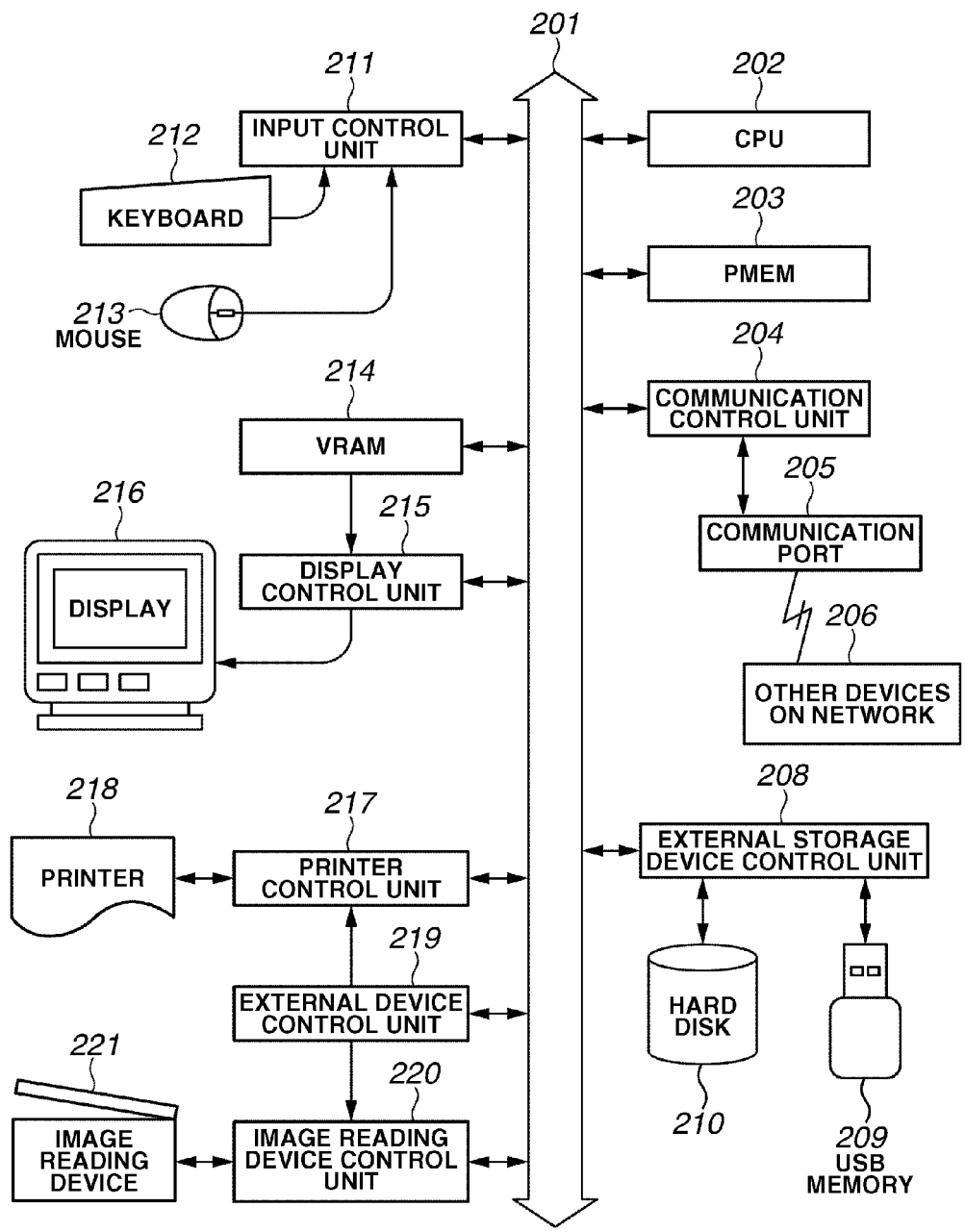
FIG. 2 is a block diagram of a hardware configuration of a client PC, an HTTP sever, and a web application server shown in FIG. 1.

FIG. 2 is a block diagram of a hardware configuration of the client PCs 101, 102, and 103, HTTP server 108, and web application server 109 shown in FIG. 1. The present exemplary embodiment describes an example in which the web application server 109 acts as an information processing apparatus and performs processes on the content. However, the present invention can also be applied to the client PCs 101, 102, and 103 in the case where a database is created in a storage device of the client PCs 101, 102, and 103.

In FIG. 2, a central processing unit (CPU) 202, a program memory (PMEM) 203, and a communication control unit 204 are connected to a system bus 201. In addition, an external storage device control unit 208, an input control unit 211, and a video image memory (VRAM) 214 are connected to the system bus 201. Furthermore, a display control unit 215, a printer control unit 217, an external device control unit 219, and an image reading device control unit 220 are connected to the system bus 201.

The communication control unit 204 controls the input and output of data in a communication port 205. The communication port 205 outputs and sends signals to the communication port of other devices 206 on a network through a communication line.

The external storage device control unit 208 controls access to data filing disks such as a USB memory 209 and a hard disk (HD) 210.

Input devices such as a keyboard 212 and a mouse 213 are connected to the input control unit 211. A user operates these input devices to give operation instructions to the system. A display 216 is connected to the video image memory (VRAM) 214 through the display control unit 215. Data to be displayed on the display 216 is rasterized as bit map data on the VRAM 214.

A user can move a cursor in the X-direction and the Y-direction on the display 216 as desired using the mouse 213 to choose a command or an icon in the command menu for instructing image information processing. The user can also use the mouse 213 to instruct editing or to point to a drawing position.

The PMEM 203 selects and reads programs for executing the processes according to the present exemplary embodiment from the hard disk 210 and supplies the programs to the CPU 202. Data input from the keyboard 212 is stored in the PMEM 203, which is also text memory, as coded information.

The printer control unit 217 controls the outputting of data to a printer 218. The image reading device control unit 220 controls an image reading device 221. The external device control unit 219 controls external devices such as the printer 218 and the image reading device 221.

In the present exemplary embodiment, the client PCs 101, 102, and 103 are not required to be directly connected to the printer 218 via the printer control unit 217, and to the image reading device 221 via the image reading device control unit 220.

In addition, the present invention is applicable in the case where the communication port 205 connected to the communication control unit 204 and the communication line are a public line instead of a network such as a LAN as described in the present exemplary embodiment.

Furthermore, the image reading device control unit 220 and the image reading unit 221 can be physically separate components. In the case where a component includes the image reading unit 221 and the image reading device control unit 220, the component is considered to have the same functions as two separate components.

In addition, the programs to be stored in the PMEM 203 can be stored in a storage medium such as a hard disk (HD) or a USB memory directly connected to the apparatus, or can be stored on another device on the network.

A general-purpose web browser (e.g., Microsoft Internet Explorer®) is stored in the storage medium of the client PCs 101, 102, and 103. The CPU 202 reads and executes a web browser program, and a user interface is implemented on the web browser.

Figure 3:
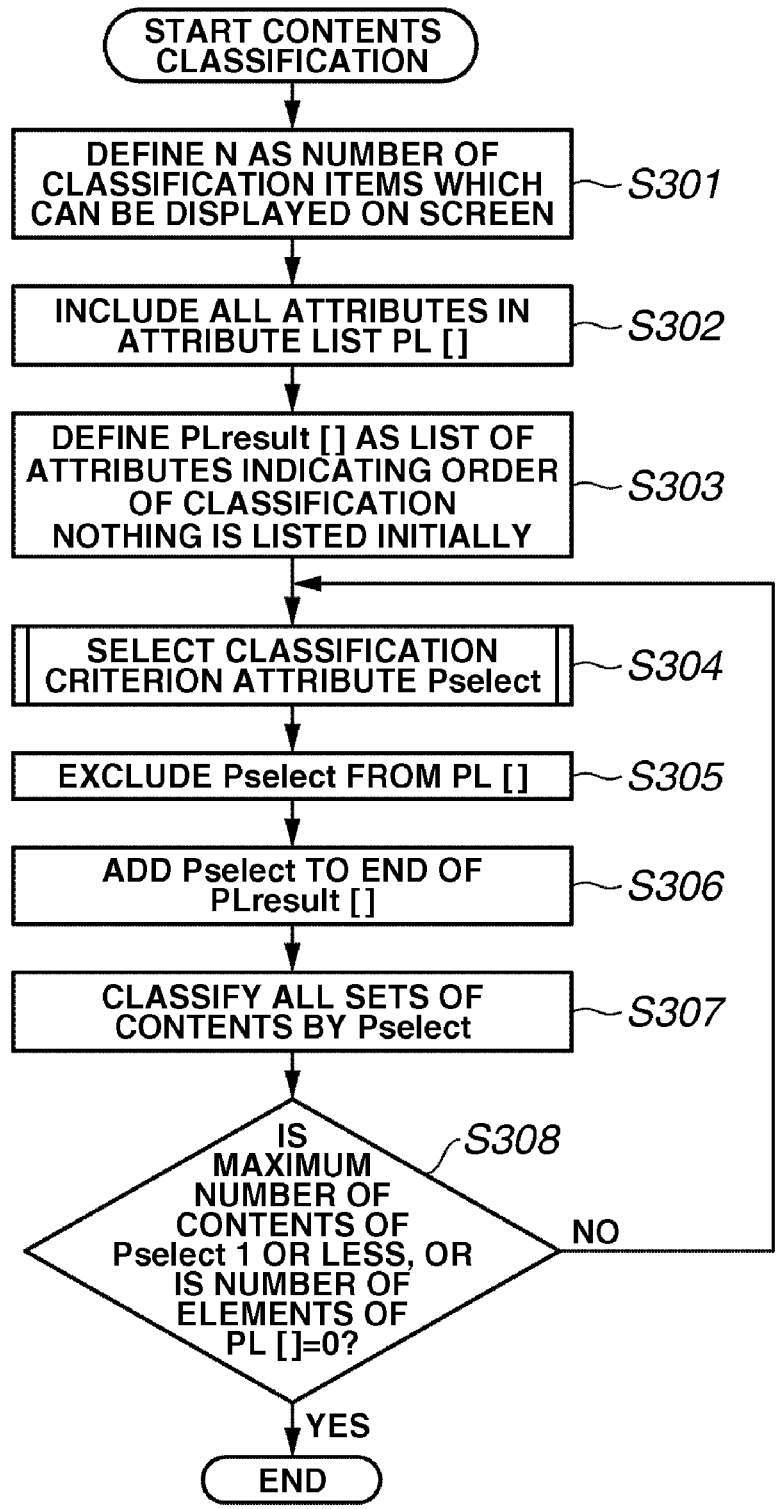
FIG. 3 is a flowchart illustrating an example of a data processing procedure in an information processing apparatus according to an exemplary embodiment of the present invention.

FIG. 3 is a flowchart illustrating an example of a first data processing procedure, which is a content classification procedure, in the information processing apparatus according to an exemplary embodiment of the present invention. The CPU 202 of the client PCs 101, 102, and 103 loads control programs from the hard disk 210 into the PMEM 203 and executes the programs to realize each of the steps. In the following description, the various parameters, lists, and data are stored in the PMEM 203.

In step S301, the CPU 202 defines N as the number of classification items that can be displayed on the screen at once (e.g., the maximum number of classification items that can be displayed on the screen without scrolling). In step S302, the CPU 202 defines PL[ ] as a list of attributes not yet selected as a classification criterion. Since there is no attribute selected as a classification criterion at this point, all attributes are included in the attribute list PL[ ].

In step S303, the CPU 202 defines PLresult[ ] as a list of attributes indicating the order of classification. Since there is no order of classification at this point, nothing is listed in PLresult[ ].

In step S304, the CPU 202 selects an attribute Pselect which is a criterion for classifying contents in accordance with the flowchart in FIG. 4 (described later). In step S305, the CPU 202 excludes the attribute Pselect from the attribute list PL[ ], and in step S306, adds the attribute Pselect to the end of the list PLresult[ ]. In step S307, the CPU 202 classifies all the sets of contents by the attribute Pselect.

In step S308, the CPU 202 determines whether the maximum number of contents of the attribute Pselect is one or less or the number of elements in the attribute list PL[ ] is 0. In the case where the CPU 202 determines that neither of the conditions is satisfied (NO in step S308), the process returns to step S304. On the other hand, in the case where the CPU 202 determines that at least one condition is satisfied (YES in step S308), the process ends.

Figure 4:
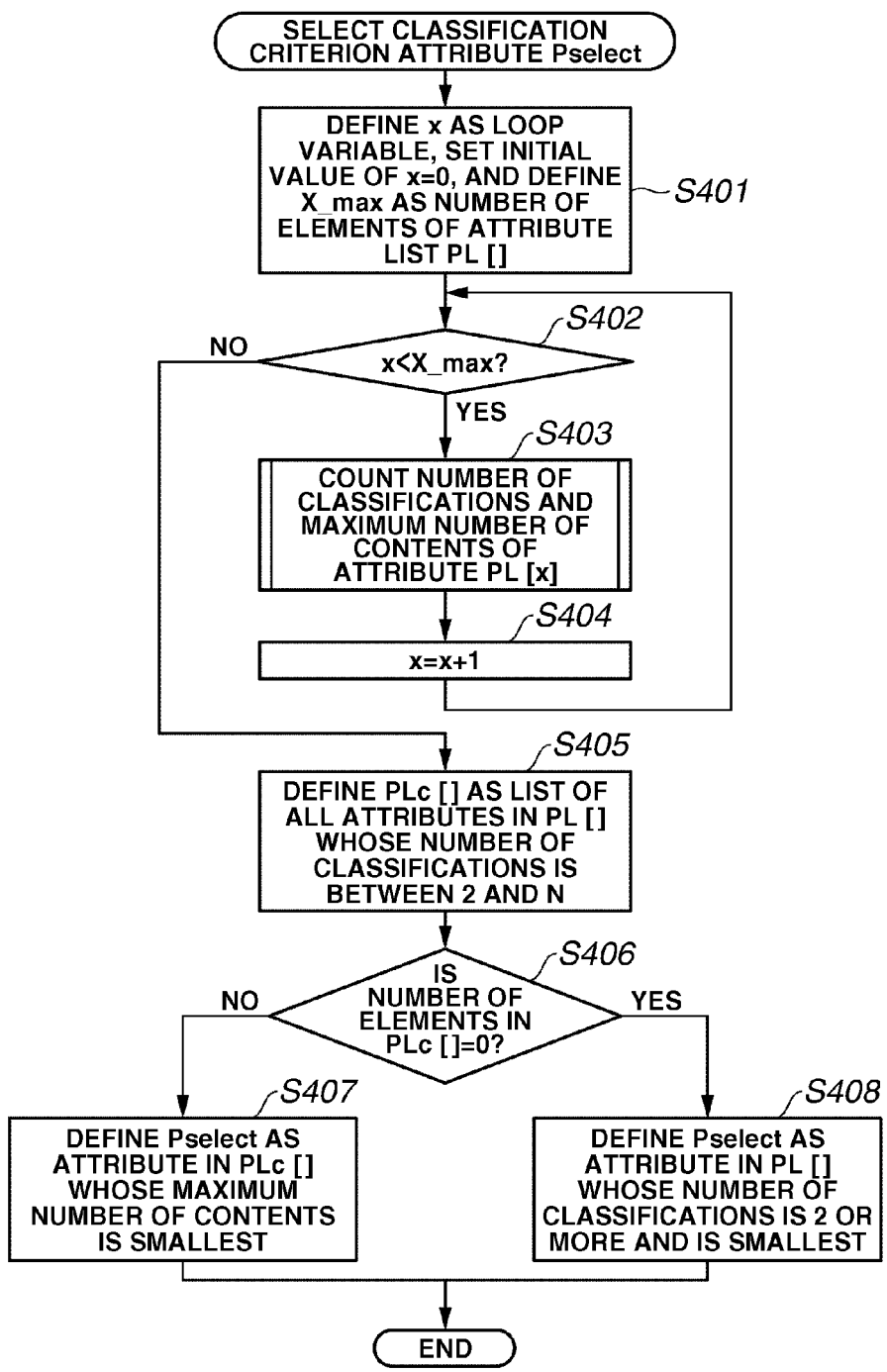
FIG. 4 is a flowchart illustrating an example of a data processing procedure in the information processing apparatus according to an exemplary embodiment of the present invention.

FIG. 4 is a flowchart illustrating an example of a data processing procedure, which is a procedure for selecting the attribute Pselect, in the information processing apparatus according to an exemplary embodiment of the present invention (step S304 in FIG. 3). The CPU 202 loads control programs from the hard disk 210 onto the PMEM 203 and executes the programs to realize each of the steps.

In step S401, the CPU 202 defines x as a loop variable, sets the initial value of x as "0", and defines X_max as the number of elements in the attribute list PL[ ].

In step S402, the CPU 202 determines whether the loop variable x is smaller than the number of elements X_max. In the case where the CPU 202 determines that x is smaller, the process proceeds to step S403, in which the CPU 202 counts the number of classifications and the maximum number of contents of the attribute list PL[x] in accordance with the flowchart in FIG. 5 (described later). In step S404, the CPU 202 substitutes x by x+1, and the process returns to step S402.

On the other hand, in the case where the CPU 202 determines that x is not smaller than X_max in step S402, the process proceeds to step S405. In step S405, the CPU 202 defines PLc[ ] as a list of all attributes in PL[ ] whose number of classifications are between 2 and N.

In step S406, the CPU 202 determines whether the number of elements in PLc[ ] is "0". In the case where the CPU 202 determines the number of elements is not "0", the CPU 202 defines an attribute in PLc[ ] whose maximum number of contents is smallest as Pselect in step S407. The process then ends.

On the other hand, in the case where the CPU 202 determines that the number of elements in PLc[ ] is "0" in step S406, the CPU 202 defines an attribute whose number of classifications is two or more and is smallest in PL[ ] as Pselect in step S408. The process then ends.

Figure 5:
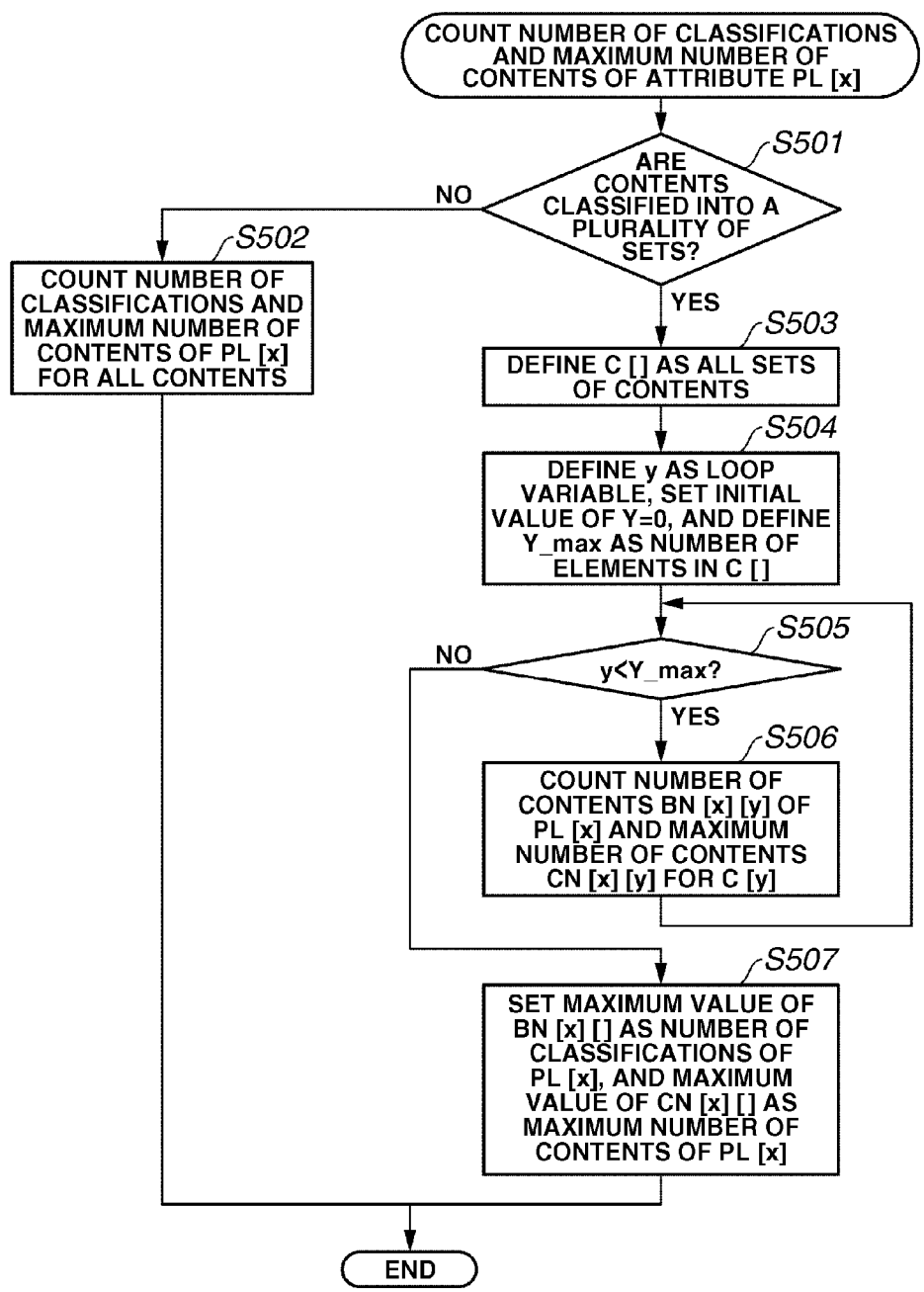
FIG. 5 is a flowchart illustrating an example of a data processing procedure in the information processing apparatus according to an exemplary embodiment of the present invention.

FIG. 5 is a flowchart illustrating an example of a data processing procedure, which is a procedure for counting the number of classifications and the maximum number of contents of the attribute list PL[x], in the information processing apparatus according to an exemplary embodiment of the present invention (step S403 in FIG. 4). The CPU 202 loads control programs from the hard disk 210 onto the PMEM 203 and executes the programs to realize each of the steps.

In step S501, the CPU 202 determines whether contents are already classified into a plurality of sets. In the case where the CPU 202 determines that the contents are not yet classified, the process proceeds to step S502, in which the CPU 202 counts the number of classifications and the maximum number of contents of the attribute PL[x] for all contents, and the process ends. That is, the process proceeds to step S502 when the first classification of contents is to be conducted.

On the other hand, in the case where the CPU 202 determines that contents are already classified into a plurality of sets, the process proceeds to step S503, in which the CPU 202 defines all sets of contents as C[ ]. In step S504, the CPU 202 defines y as a loop variable, sets the initial value of y as "0", and defines Y_max as the number of elements of C[ ].

In step S505, the CPU 202 determines whether the loop variable y is smaller than the number of elements Y_max. In the case where the CPU 202 determines that the loop variable y is smaller, the process proceeds to step S506, in which the CPU 202 counts the number of classifications BN[x][y] and the maximum number of contents CN[x][y] of PL[x] for C[y]. The process then returns to step S505.

On the other hand, in the case where the CPU 202 determines that the loop variable y is not smaller than the number of elements Y_max in step S505, the process proceeds to step S507, in which the CPU 202 defines the maximum value of BN[x][ ] as the number of classifications of PL[x], and the maximum value of CN[x][ ] as the maximum number of contents of PL[x]. The process then ends.

Figures 6, 7:
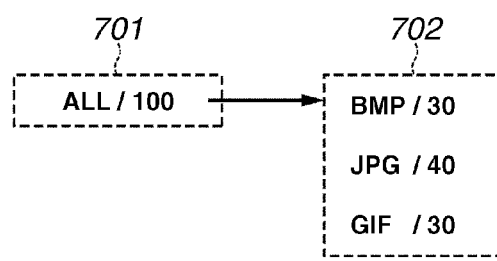
FIG. 6 illustrates an example of a classification table in which contents are classified by the attributes in the information processing apparatus according to an exemplary embodiment of the present invention.
FIG. 7 illustrates an example of a set of contents searched by the information processing apparatus according to an exemplary embodiment of the present invention.

FIG. 6 illustrates an example of the classification table in which the contents are classified by the attributes in the information processing apparatus according to an exemplary embodiment of the present invention. In this example, 100 image contents are classified by each attribute value associated with the image content for each attribute. In this table, attribute value/number of contents 605 is the attribute value and the number of contents that have each attribute value. The maximum number of contents 606 is the maximum number of contents having the same attribute value in each attribute. The number of classifications 607 is the number of attribute values in each attribute.

In FIG. 6, the attributes are the file format 601, color description 602, creator 603, and detail of content 604. In the column of the file format attribute 601, 30 contents from among the 100 contents have BMP as the attribute value, 40 contents have JPG, and 30 contents have GIF. Since the maximum number of contents with the same attribute value is 40 of contents having JPG as the attribute value, the maximum number of contents 606 of the file format attribute 601 is 40. In addition, since the file format attribute 601 has three attribute values, the number of classifications 607 is 3.

In the present exemplary embodiment, an attribute is a category of the information associated with each content. In addition, an attribute value is information associated with each content. Furthermore, each content has attribute values for each attribute.

A case where the flow of process shown in FIG. 3 to FIG. 5 is applied to the 100 image contents in FIG. 6 is described below.

In this example, 10 or less classification items can be displayed on the screen of the display 216 shown in FIG. 2. Consequently, N in step S301 of FIG. 3 is 10. In step S302, the elements of PL[ ] are file format attribute 601, color description attribute 602, creator attribute 603, and detail of content attribute 604.

In step S303, PLresult[ ] is initialized and is an empty list. In step S304, the process proceeds to the process in FIG. 4.

The process in step S403 is repeated four times corresponding to the number of elements of PL[ ] (or the number of attributes 601 to 604). In other words, the process in FIG. 5 is conducted for each of the attributes 601 to 604, and the CPU 202 counts the number of classifications and the maximum number of contents of each attribute.

In step S501, since the contents have not yet been classified, the process proceeds to step S502. In step S502, the CPU 202 counts the maximum number of contents 606 and the number of classifications 607.

The process then returns from that in FIG. 5 to FIG. 4. In step S405, since the number of classifications of each of the attributes 601, 602, and 603 is between 2 and N (or 10 in this case), these three attributes are the elements of PLc[ ]. In step S406, since the number of elements of PLc[ ] is not 0, the process proceeds to step S407.

In step S407, the attribute whose maximum number of contents in PLc[ ] is smallest is the file format attribute 601, whose maximum number of contents is 40. Therefore, this attribute 601 is defined as Pselect.

The process then returns from the process in FIG. 4 to FIG. 3. In step S305, the CPU 202 excludes the file format attribute 601 from PL[ ]. As a result, the elements of PL[ ] become the color description attribute 602, the creator attribute 603, and the detail of content attribute 604. In step S306, the CPU 202 adds the file format attribute 601 to the end of PLresult[ ]. As a result, the element of PLresult[ ] becomes the file format attribute 601.

In step S307, the CPU 202 classifies all sets of 100 image contents 701 into three sets 702, as shown in FIG. 7, by the file format attribute 601 listed first in PLresult[ ]. The three sets include 30 BMP contents, 40 JPG contents, and 30 GIF contents.

In step S308, the maximum number of contents in the file format attribute 601 is 40, and the number of elements of PL[ ] is not 0. The process, therefore, proceeds to step S304, or to the process in FIG. 4.

In step S403, the CPU 202 counts the number of classifications and the maximum number of contents of the elements of the attribute list PL[ ], i.e., the color description attribute 602, creator attribute 603, and detail of content attribute 604.

The process then proceeds to that in FIG. 5. In step S501, since the contents are classified into the three sets 702, the process proceeds to step S503. In step S503, the elements of C[ ] are defined as three sets, corresponding to 30 BMP contents, 40 JPG contents, and 30 GIF contents from among the contents 702.

In step S506, the CPU 202 counts the number of classifications and the maximum number of contents of each of the elements of PL[ ], i.e., color description 602, creator 603, and detail of content 604, in each set of contents, i.e., 30 BMP contents, 40 JPG contents, and 30 GIF contents. The result of counting is shown in FIG. 8. For example, the maximum number of contents of the color description attribute 602 in the set of 30 BMP contents is 20.

Figures 9, 10:
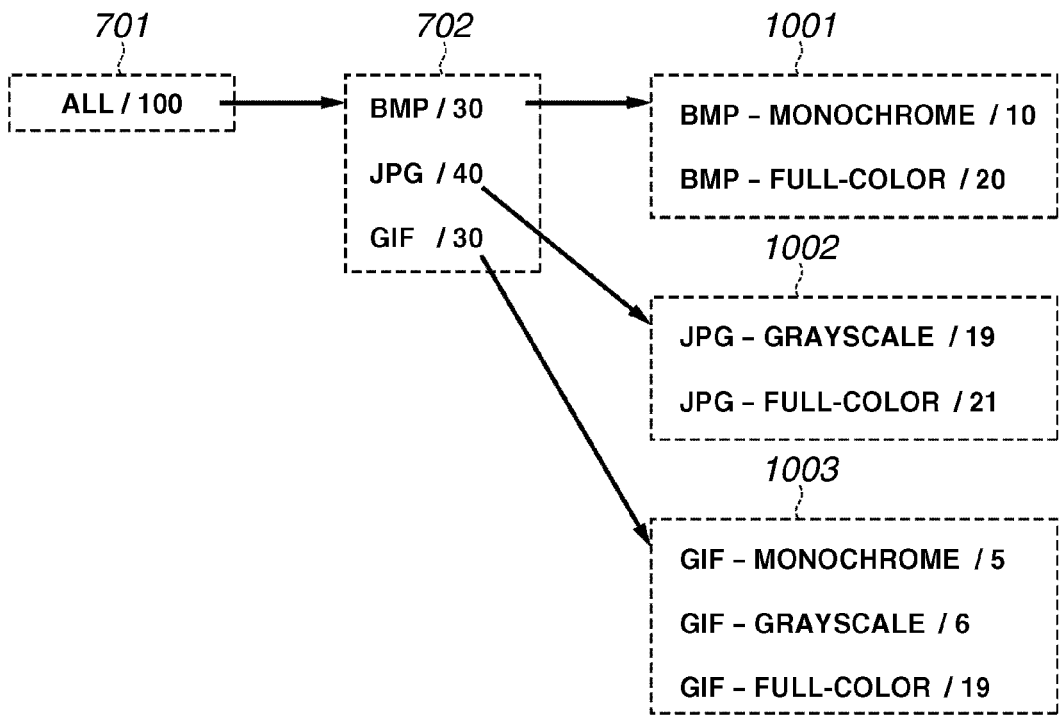
FIG. 9 illustrates an example of a result of counting contents in the information processing apparatus according to an exemplary embodiment of the present invention.
FIG. 10 illustrates an example of a set of contents searched by the information processing apparatus according to an exemplary embodiment of the present invention.

In step S507, the CPU 202 counts the maximum values of the number of classifications and the maximum number of contents of each set of contents for each attribute. The CPU 202 sets these maximum values as the number of classifications and the maximum number of contents of each of the color description, creator, and detail of content attributes. An example of this setting is shown in FIG. 9.

In FIG. 8, the maximum numbers of contents 801, 802, and 803 are obtained by the counting process of FIG. 3. The numbers of classifications 804, 805, and 806 correspond to the numbers of elements of the attributes 602, 603, and 604, respectively. A count result 807 is stored in the PMEM 203 according to the counting process of FIG. 3.

In FIG. 8, the maximum value of the maximum numbers of contents 801 to 803 of the color description attribute 602 is 21. Therefore, in FIG. 9, the maximum number of contents 902 of the color description attribute 602 is 21. Similarly, the maximum number of classifications 901 for the color description attribute 602 is 3, which is the largest of the numbers of classification 804 to 806. The maximum numbers of contents 904 and 906 and the numbers of classifications 903 and 905 of the creator attribute 603 and the detail of content attribute 604, respectively, are set in a similar manner.

The process then returns to that in FIG. 4. In step S405, the attributes 602, 603, and 604 whose numbers of classifications are between 2 and N are defined as the elements of PLc[ ]. In step S406, since the number of elements of PLc[ ] is not 0, the process proceeds to step S407.

In step S407, the attribute in PLc[ ] whose maximum number of contents is smallest is the color description attribute 602 (i.e., the maximum number of contents is 21). Therefore, Pselect is defined as the color description attribute 602.

The process then returns to that of FIG. 3. In step S305, the CPU 202 excludes the color description attribute 602 from PL[ ]. As a result, the elements of PL[ ] become the creator attribute 603 and the detail of content attribute 604. In step S306, the CPU 202 adds the color description attribute 602, which is Pselect, to the end of PLresult[ ]. Consequently, the elements of PLresult[ ] become the file format attribute 601 and the color description attribute 602.

In step S307, the CPU 202 classifies the three sets of contents 702, i.e., 30 BMP contents, 40 JPG contents, and 30 GIF contents, by the color description attribute 602 as shown in FIG. 10. Thus, the BMP set 1001 is classified into two sets, i.e., 10 BMP—monochrome contents and 20 BMP—full-color contents. The JPG set 1002 is classified into two sets, i.e., 19 JPG—grayscale contents and 21 JPG—full-color contents. The GIF set 1003 is classified into three sets, i.e., 5 GIF—monochrome contents, 6 GIF—grayscale contents, and 19 GIF—full-color contents.

In step S308, the maximum number of contents of the color description attribute 602 is 21 and the number of elements of PL[ ] is not 0. Consequently, the process returns to step S304.

The above process of classification is continued until the maximum number of contents of Pselect becomes one, or the number or elements in PL[ ] becomes 0 in step S308.

FIG. 11 to FIG. 14 illustrate examples of content selection screens displayed on the display 216 in FIG. 2. These screens are displayed to a user in the first exemplary embodiment.

Figure 11:
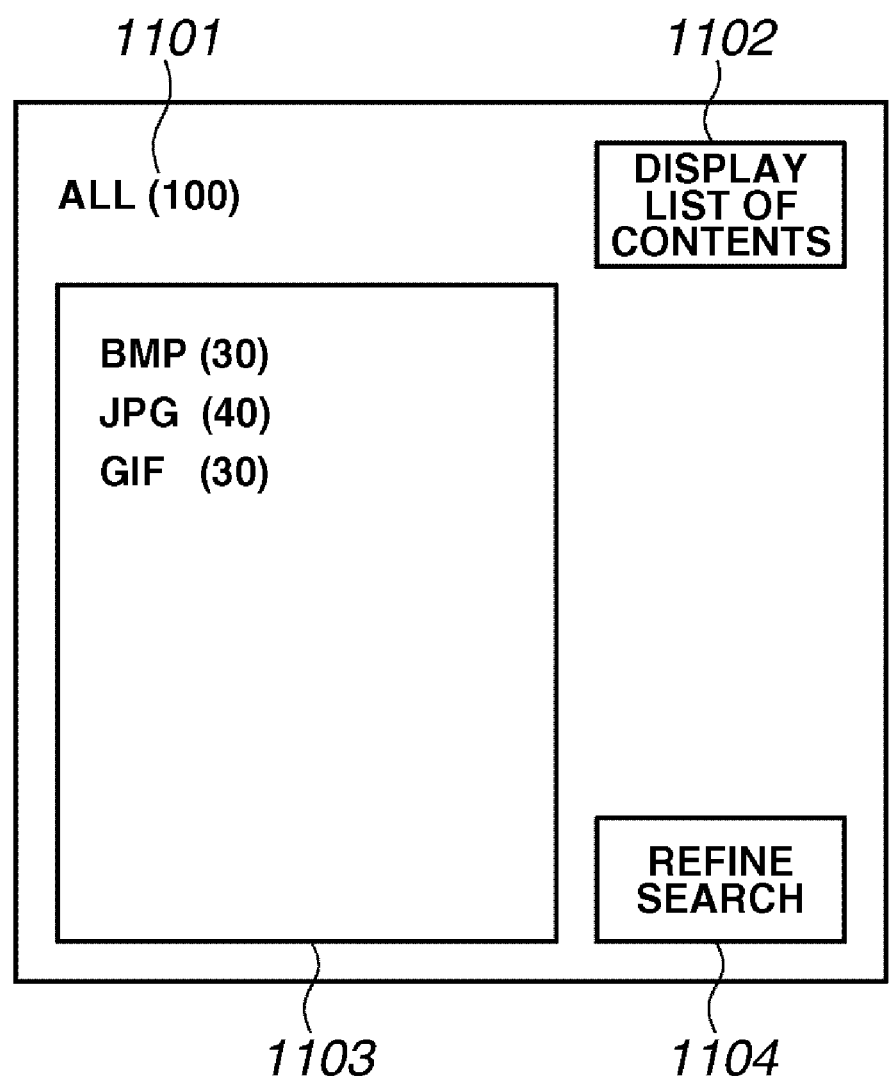
FIG. 11 illustrates an example of a content selection screen displayed on a display shown in FIG. 2.

FIG. 11 illustrates an example of a screen for refining search on the image contents. On this screen, a user refines the search on the 100 image contents classified by the file format attribute 601 in the above-described process.

In FIG. 11, a classification indicator 1101 indicates that the selection can be made from all of the 100 image contents. When the user presses a contents list display button 1102, the CPU 202 controls the display 216 to provide a screen such as the one shown in FIG. 12 which displays the list of 100 image contents.

The attribute value list 1103 is used to refine search on the 100 contents. In this example, the user can choose from either one of the attribute values of the file format attribute 601, i.e., BMP, JPG, and GIF. On the screen shown in FIG. 11, BMP, JPG, and GIF, which are attribute values of the file format attribute 601, and the numbers of contents of the respective attribute values (30, 40, and 30) are displayed.

A refine search button 1104 is used to refine search on the 100 image contents. When the user presses the refine search button 1104 while selecting GIF on the attribute list 1103, the CPU 202 controls the display 216 to provide a screen such as the one shown in FIG. 13 for refining search on the 30 GIF contents. The screen in FIG. 13 corresponds to the set of contents 1003 in FIG. 10.

Figure 12:
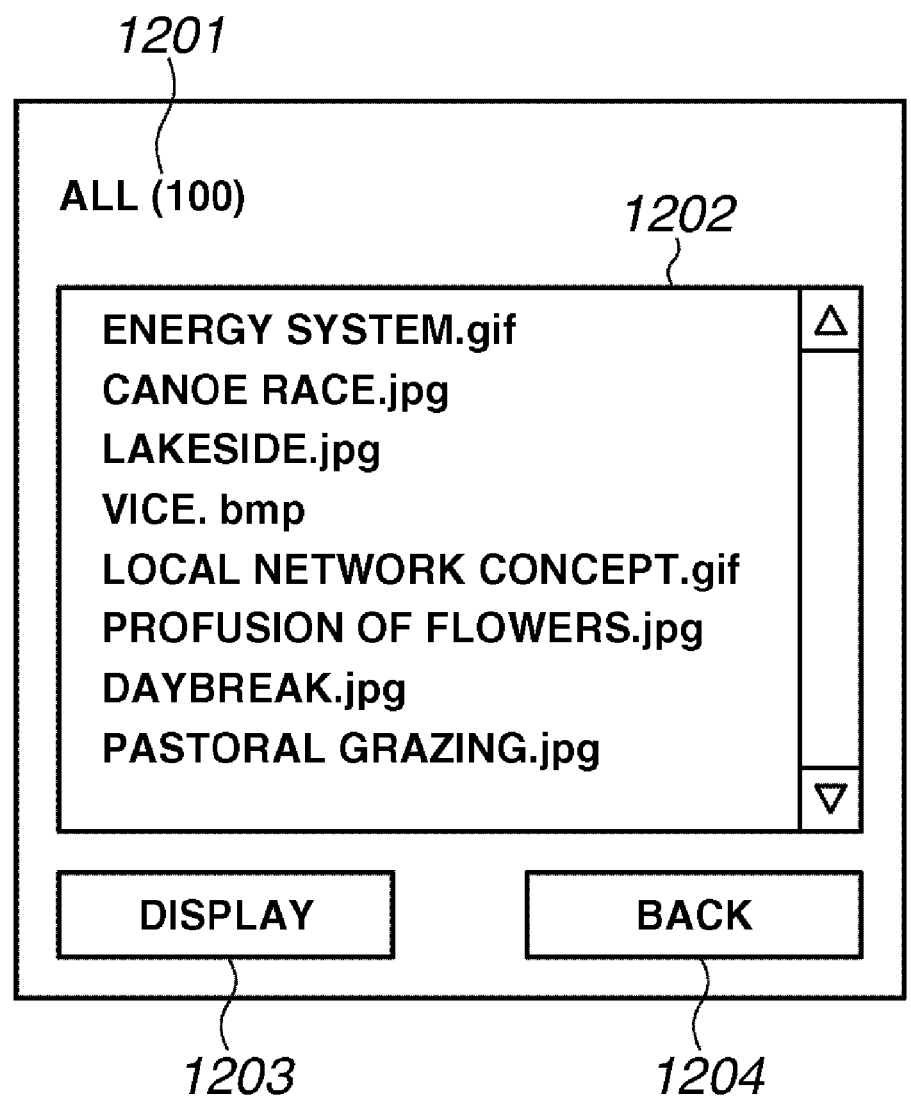
FIG. 12 illustrates an example of a content selection screen displayed on the display shown in FIG. 2.

FIG. 12 illustrates an example of a screen on the display 216 showing a list of 100 image contents from which the user can select. A classification indicator 1201 indicates that the user can select from all of the 100 image contents. A contents list 1202 is used for displaying a list of the 100 image contents. The user can see the entire list of contents classified by the file format attribute 601 by operating the scrollbar in the contents list 1202.

A display button 1203 is used for displaying image content. When the user presses the display button 1203, the CPU 202 controls the display 216 to display image content selected in the contents list 1202 on the screen.

A back button 1204 is used for going back to the screen for refining search on the contents. When the user presses the back button 1204, the CPU 202 controls the display 216 to provide a screen for refining search on the contents as shown in FIG. 11.

Figure 13:
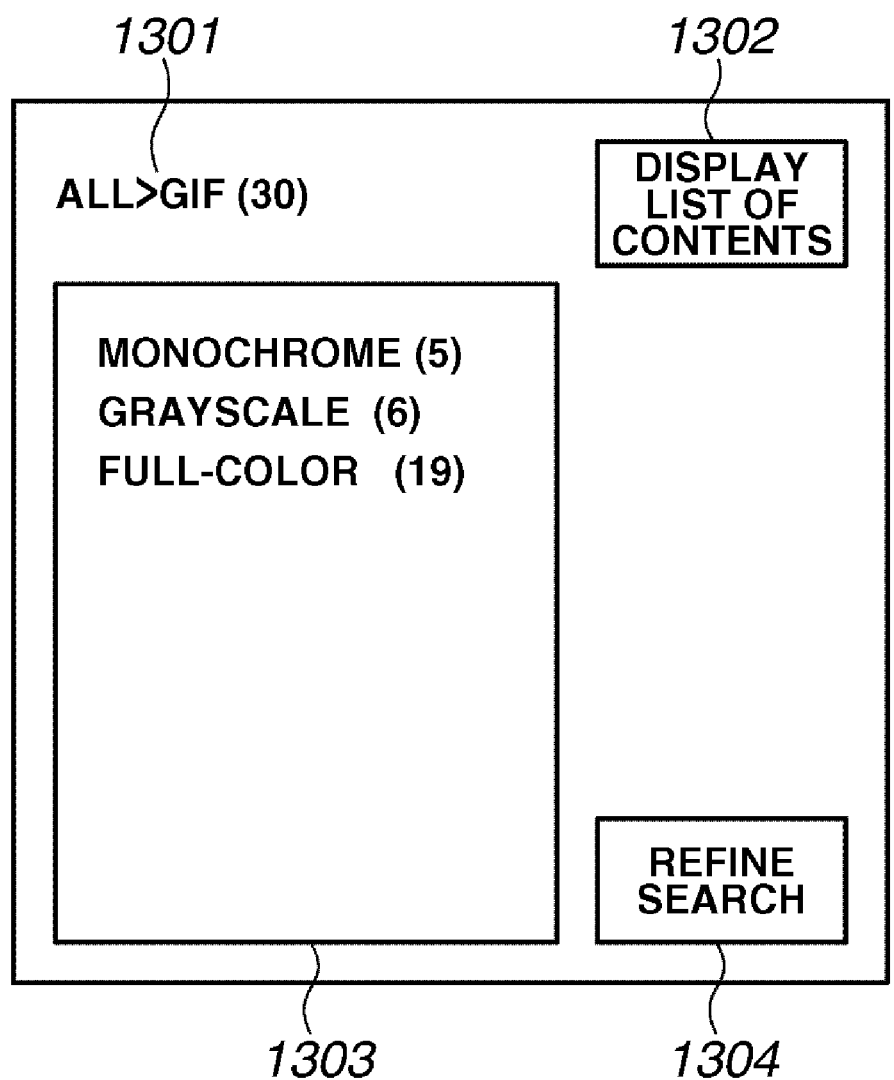
FIG. 13 illustrates an example of a content selection screen displayed on the display shown in FIG. 2.

FIG. 13 illustrates an example of a screen on the display 216 for refining search on the image contents. In this example, the user refines search for image content from 30 GIF contents of the 100 image contents. A classification indicator 1301 indicates that a selection can be made from 30 GIF contents of 100 image contents. As described above, the user selects GIF from the attribute value list 1103 in FIG. 11 by operating the mouse 213 and pressing a refine search button 1104 to reach the screen in FIG. 13.

Figure 14:
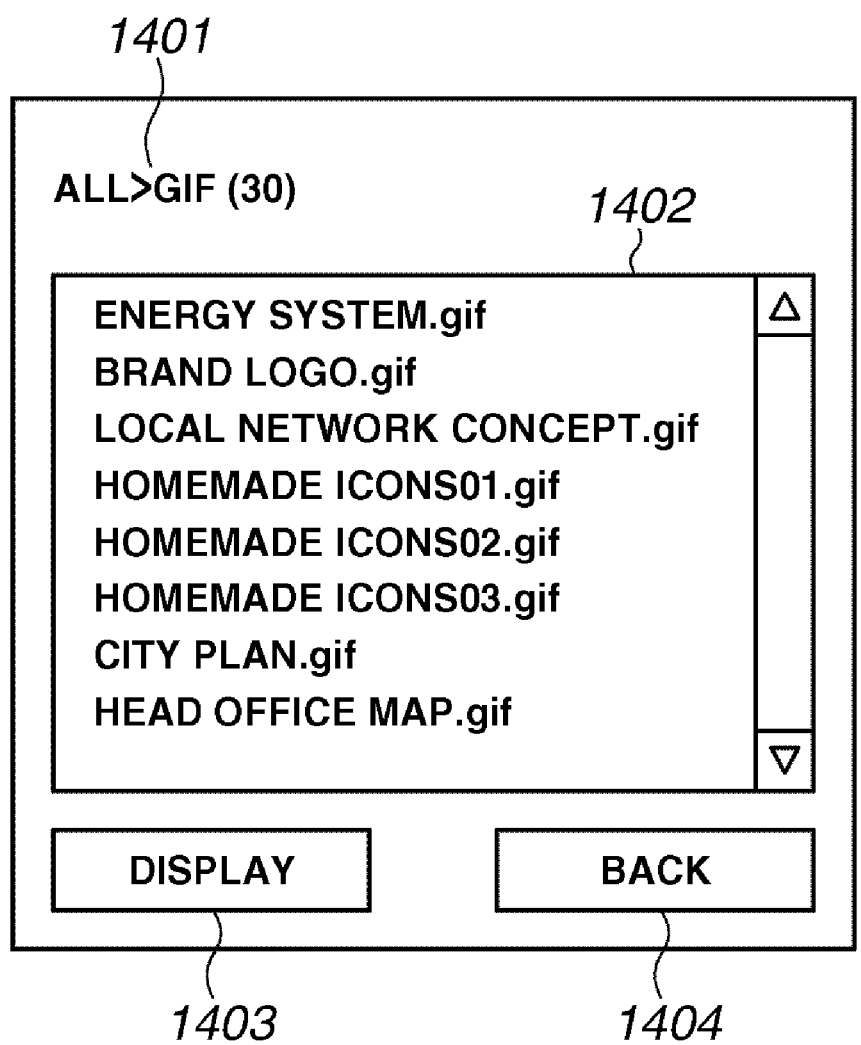
FIG. 14 illustrates an example of a content selection screen displayed on the display shown in FIG. 2.

When the user presses a content list display button 1302, the CPU 202 controls the display 216 to provide a screen such as the one shown in FIG. 14. The screen in FIG. 14 displays a list of 30 GIF contents including monochrome, grayscale, and full-color contents.

An attribute value list 1303 is used to refine search on the 30 GIF contents. The user can select an attribute value using the mouse 213. In this example, the attribute values of the color description attribute 602, i.e., monochrome, grayscale, and full-color, and their respective numbers of contents are shown.

A refine search button 1304 is used for refining search on the 30 GIF contents. When the user presses the refine search button 1304 while selecting full-color in the attribute value list 1303, the CPU 202 controls the display 216 to provide a screen for refining search on the 19 full-color contents of the 30 GIF contents.

FIG. 14 illustrates an example of a screen on the display 216 showing an image content list. In this example, the list of 30 GIF image contents from which selection can be made is shown. A classification indicator 1401 indicates that a selection can be made from 30 GIF contents of the 100 image contents.

A content list 1402 is a list of 30 GIF contents from which the user can select. When the user presses a display button 1403, the CPU 202 controls the display 216 to provide image content the user selected from the content list 1402.

A back button 1404 is used for going back to the screen for refining search on the contents. When the user presses the back button 1404, the CPU 202 controls the display 216 to provide a screen for refining search on the contents as shown in FIG. 13.

In the first exemplary embodiment described above, contents having a plurality of attributes are registered on a storage device such as the hard disk 210, and a single content is managed under a plurality of attributes. In this example, the plurality of attributes is the file format attribute 601, color description attribute 602, creator attribute 603, and detail of content attribute 604. In this example, the number of classifications 607 of the file format attribute 601 is 3 as shown in FIG. 6. However, the number can increase in the case where an additional file format is defined.

In addition, in the present exemplary embodiment, when a user selects one file format from the file format attribute 601 displayed on a screen, the contents of the selected file format are classified by the other attributes, i.e., color description attribute 602, creator attribute 603, and detail of content attribute 604. As a result, the present exemplary embodiment realizes an efficient search refinement of contents based on a selected attribute, and the user can obtain the desired content by easier operation.

In other words, as shown in FIG. 6, the image contents are classified by the attributes 601 to 604 and are stored in the hard disk 210. As shown in FIG. 3, the CPU 202 performs the process of counting the maximum number of contents to select the file format attribute 601 whose maximum number of contents is smallest. Consequently, a screen such as the one shown in FIG. 11 for searching contents based on the file format attribute 601 is displayed on the display 216 by the CPU 202. When the user selects an attribute value of the file format, e.g., GIF, and presses the refine search button 1104, the CPU 202 performs the process of FIG. 3 again. In the process, the number of contents of the color description attribute 602 is counted, and the CPU 202 controls the display 216 to provide a screen such as the one shown in FIG. 13 displaying contents corresponding to the set of GIF contents in FIG. 8.

When the user presses the content list display button 1302 in FIG. 13, the list of GIF contents as in FIG. 14 is displayed. In addition, when the user presses the search refinement button 1304, the user can refine search further by selecting one of the attribute values, monochrome, grayscale, and full-color, as shown in FIG. 13.

As described above, the present exemplary embodiment provides an information processing apparatus for conducting search on contents, including a hard disk 210 storing contents on which a plurality of attributes, e.g., file format attribute 601, color description attribute 602, creator attribute 603, and detail of content attribute 604, are set. The CPU 202 executes the processes in FIG. 3 to FIG. 5 in the PMEM 203 and classifies the contents by the plurality of attributes. This process is referred to as the first classification. The CPU 202 counts the number of contents classified by each attribute in the first classification and determines the criterion for classifying the contents. In the above-described example, an attribute whose maximum number of contents is smallest, e.g., the file format attribute 601, is defined as the classification criterion.

In addition, the CPU 202 sets the maximum number of classifications of contents in step S301 of FIG. 3, e.g., as 10 and counts the number of contents classified by the attribute whose number of contents is 10 or less. In the first classification, the detail of content attribute 604 is excluded from the process since the number of classifications is greater than 10. Therefore, the attributes 601 to 603 become the attributes for the classification.

The CPU 202 classifies the contents of the attributes 601 to 603 into sets of contents of differing attribute values under the same attribute. For example, the contents of the file format attribute 601 are classified into the content sets of BMP, JPG, and GIF. A user can refine search on the sets of contents by selecting an attribute value such as GIF by pressing the refine search button 1104. The CPU 202 controls the display 216 to display the classification of contents as shown in FIG. 13 as a result of search refinement instructed by the user.

According to the first exemplary embodiment, a user can refine search on the contents to access a desired content without unnecessary switching or scrolling of the screen. In addition, the classification of contents for an efficient search refinement can be conducted automatically.

Second Exemplary Embodiment

In the first exemplary embodiment described above, contents are already classified before a user instructs search refinement. In the second exemplary embodiment, contents are classified depending on the circumstances at the time of a user instructing search refinement. FIG. 1 and FIG. 2 also show the system configuration of the second exemplary embodiment, and since the configuration is similar to that in the first exemplary embodiment, a description of the system configuration will not be repeated.

Figure 15:
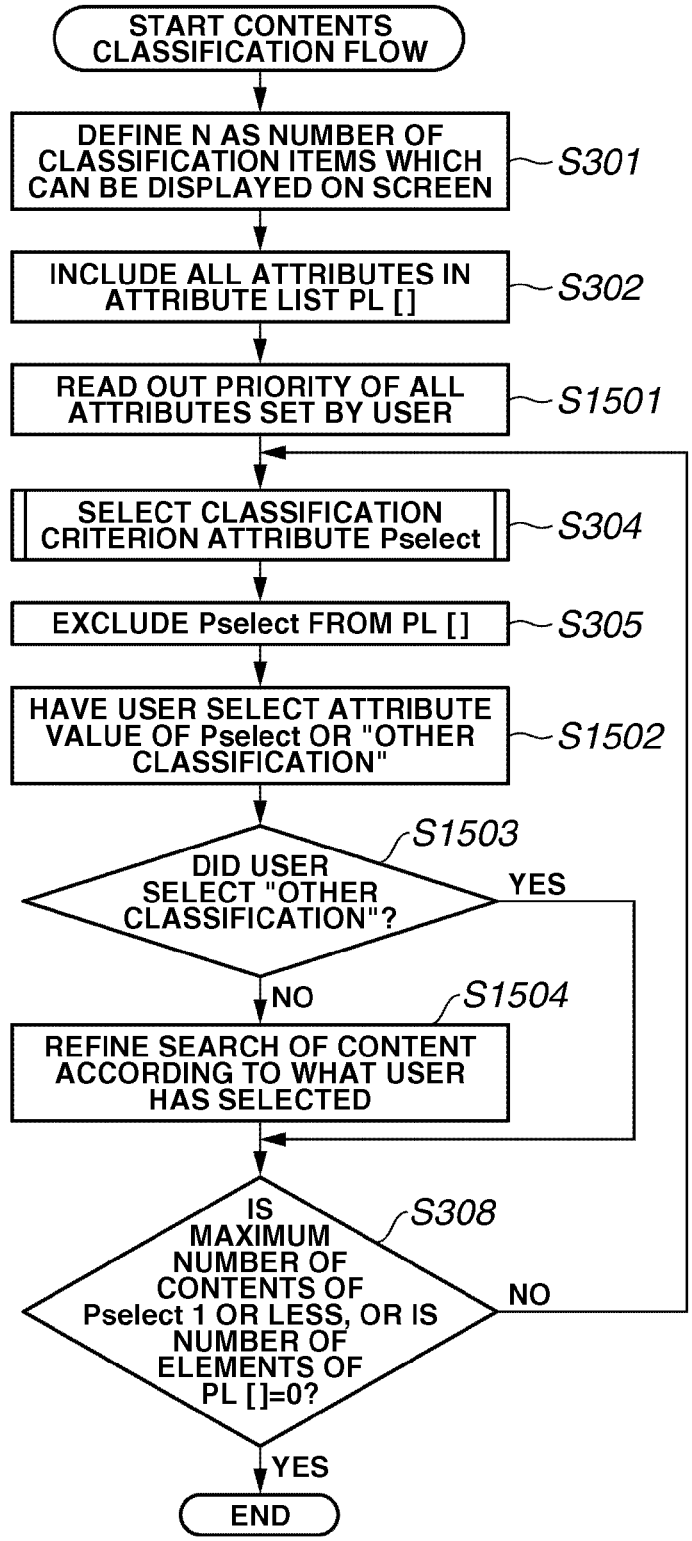
FIG. 15 is a flowchart illustrating an example of a data processing procedure in the information processing apparatus according to an exemplary embodiment of the present invention.

FIG. 15 is a flowchart illustrating an example of a data processing procedure, which is the procedure of contents classification, in the information processing apparatus according to an exemplary embodiment of the present invention. The CPU 202 loads control programs from the hard disk 210 into PMEM 203 and executes them to realize each of the steps. Since steps S301, S302, S305, and S308 are similar to those in FIG. 3, a description of these steps will not be repeated. Steps S1501, S304, and S1502 to S1504 will be described.

In step S1501 following step S302, the CPU 202 reads the value of priority of each of the attributes to be selected as the classification criterion. In this example, the user sets the priority beforehand. In step S304, the CPU 202 selects the attribute Pselect, or the criterion for classifying the contents, according to the process in FIG. 16 (described later) instead of the process in FIG. 4 as in the first exemplary embodiment.

In step S1502, the CPU 202 displays all of the attribute values of the above attribute Pselect and "other classification" as choices for the user to select from. In step S1503, the CPU 202 determines whether the user has selected "other classification". In the case where the CPU 202 determines that the user has selected "other classification", the process proceeds to step S308. On the other hand, in the case where the CPU determines that the user has not selected "other classification", the process proceeds to step S1504 and the CPU 202 refines search on the contents according to the attribute values elected by the user. The process then proceeds to step S308.

Figure 16:
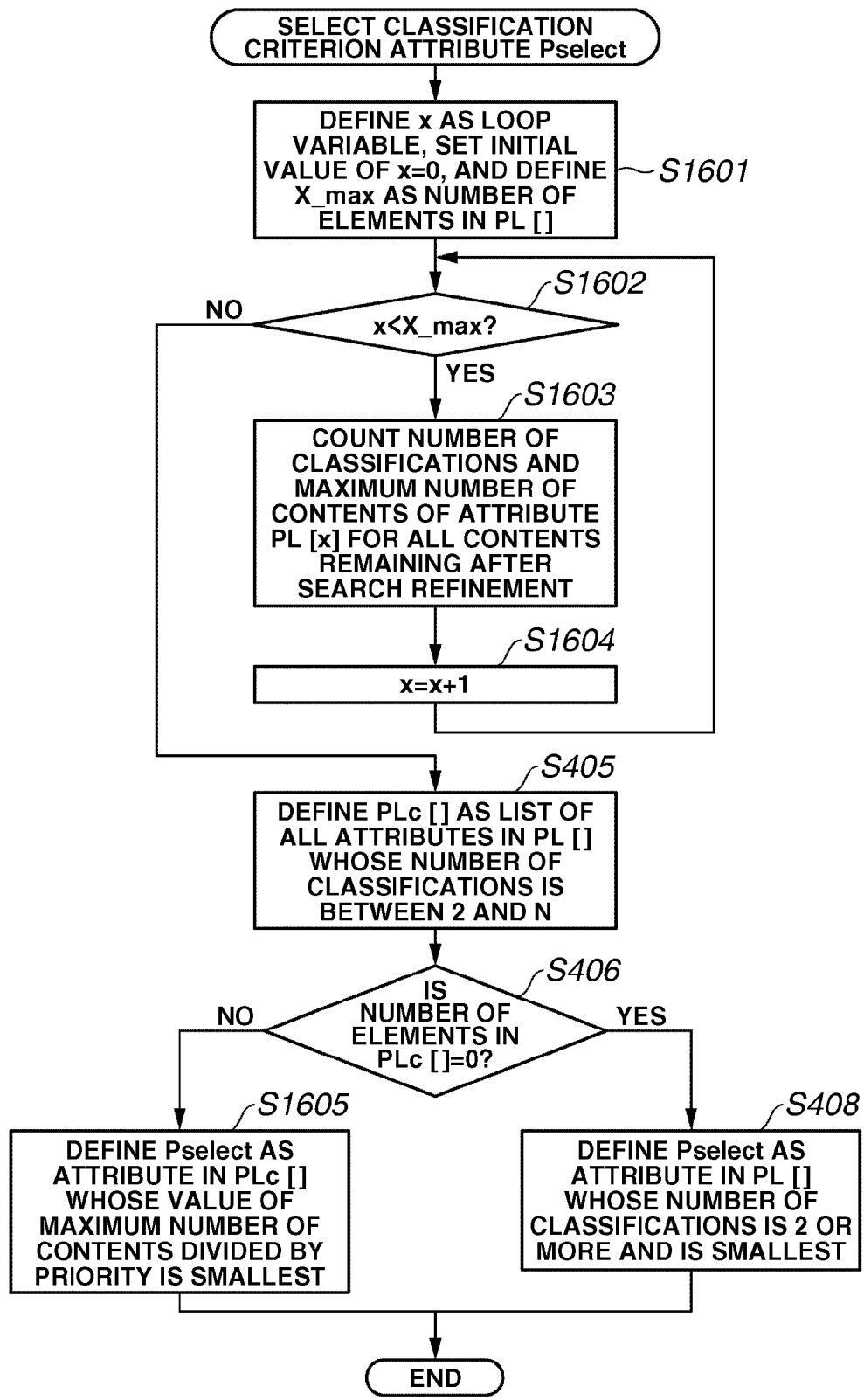
FIG. 16 is a flowchart illustrating an example of a data processing procedure in the information processing apparatus according to an exemplary embodiment of the present invention.

FIG. 16 is a flowchart illustrating an example of a data processing procedure, which is the process of selecting Pselect, in the information processing apparatus according to an exemplary embodiment of the present invention (step S304 in FIG. 15). The CPU 202 loads control programs from the hard disk 210 into PMEM 203 and executes the programs to realize each of the steps. Since the processes in steps S405 to S408 are similar to those in FIG. 4, a description of these steps will not be repeated. Steps S1601 to S1605 will be described below.

In step S1601, the CPU 202 defines x as a loop variable, sets the initial value of x as 0, and defines X_max as the number of elements of PL[ ]. In step S1602, the CPU 202 determines whether x is smaller than X_max. In the case where the CPU 202 determines that x is smaller, in step S1603, the CPU 202 counts the number of classifications and the maximum number of contents of the attribute list PL[x] for all contents left after conducting search refinement. In step S1604, the CPU 202 substitutes x by x+1, and the process then returns to step S1602.

On the other hand, in the case where the CPU 202 determines that x is not smaller than X_max in step S1602, the process proceeds to step S405. In step S406, the CPU 202 determines whether the number of elements of PLc[ ] is 0. In the case where the CPU 202 determines that the number of elements is not 0, in step S1605, the CPU 202 defines the attribute whose maximum number of contents divided by the value of priority is smallest in PLc[ ] as Pselect.

FIG. 6, FIG. 8, FIG. 17, FIG. 18, and FIG. 19 illustrate data for use in the second exemplary embodiment. In FIG. 6, 100 image contents are classified by each attribute value associated with the content for every attribute. Since the number of contents of each attribute value and the maximum number of contents and the number of classifications of each attribute are similar to those in the first exemplary embodiment, a description of these numbers will note be repeated.

A case where the process shown in FIG. 15 and FIG. 16 is applied to the 100 image contents shown in FIG. 6 is described below.

In this example, the maximum number of classification items that can be displayed on the screen is 10. Thus, in step S301, N is 10. In step S302, the elements of PL[ ] are file format attribute 601, color description attribute 602, creator attribute 603, and detail of content attribute 604. In step S1501 of FIG. 15, the CPU 202 reads the priority values of the attributes 601 to 604 set by a user.

FIG. 17 illustrates an example of a table of the attributes and the corresponding priority values stored in the hard disk 210 in FIG. 2. The device in which the table is stored is not limited to the hard disk 210 and may be the USB memory 209 shown in FIG. 2. As shown in FIG. 17, the priority values of the attributes 601, 602, 603, and 604 are set as 50, 20, 30, and 100, respectively.

In step S304, the process proceeds to the flowchart in FIG. 16. The CPU 202 repeats the process of step S1603 four times, or by the number of elements of PL[ ]. Thus, the CPU 202 counts the number of classifications and the maximum number of contents of each of the four attributes 601 to 604. In step S405, the attributes 601, 602, and 603 whose numbers of classification are between 2 and N become the elements of PLc[ ]. As a result, since the number of elements of PLc[ ] is not 0 in step S406, the process proceeds to step S1605. In step S1605, the CPU 202 divides the maximum number of contents of each attribute, which is an element of PLc[ ], by the corresponding priority value, and stores resultant values in the PMEM 203 as classification costs.

FIG. 18 and FIG. 19 illustrate examples of a table of classification costs calculated by the information processing apparatus according to an exemplary embodiment of the present invention. The CPU 202 calculates the classification cost using the priority value stored in the hard disk 210 and the maximum number of contents counted in the process of FIG. 16. In the present exemplary embodiment, the classification costs of the three attributes 601, 602, and 603 are 0.8, 3.0, and 1.6, respectively. Since the classification cost of the file format attribute 601 is the smallest, this attribute 601 becomes Pselect.

The process then returns to that in FIG. 15. In step S305, the CPU 202 excludes the file format attribute 601 from PL[ ]. Consequently, the elements of PL[ ] become the color description attribute 602, creator attribute 603, and detail of content attribute 604.

In step S1502, the user can select from the attribute values of the file format attribute 601, i.e., BMP, JPG, and GIF, and "other Classification". In this example, the user selects GIF. In step S1503, since the user selects GIF instead of "other classification", the process proceeds to S1504 in which the CPU 202 narrows down the 100 contents to 30 GIF contents.

In step S308, the maximum number of contents of the file format attribute 601 is 30 and the number of elements of PL[ ] are not 0. The process thus proceeds to step S304 and to the process in FIG. 16. In step S1603, the CPU 202 counts the number of classifications and the maximum number of contents of the attributes 602, 603, and 604, which are elements of PL[ ]. The resulting count data 807 of the GIF contents stored in the PMEM 203 is shown in FIG. 8. For example, the maximum number of contents of the color description attribute 602 is 19. In step S405, the elements of PLc[ ] are attribute 602, 603, and 604 whose number of classifications is between 2 and N. In step S406, since the number of elements of PLc[ ] is not 0, the process proceeds to step S1605.

In step S1605, the CPU 202 calculates the classification cost of each of the attributes that are elements of PLc[ ]. The classification costs of the attributes 602, 603, and 604 are 0.95. 0.5, and 0.13, respectively, as shown in FIG. 19. Since the classification cost of the detail of content attribute 604 is the smallest, the attribute 604 becomes Pselect.

The process returns to FIG. 15. In step S305, the CPU 202 excludes the detail of content attribute 604 from PL[ ]. Thus, the elements of PL[ ] become the attributes 602 and 603.

In step S1502, the user can select from the attribute values of the detail of content attribute 604, i.e., "logo", "map", "icon", and "schematic diagram", and from "other classification". In this example, the user selects "icon". In S1503, since the user has selected "icon" instead of "other classification", the process proceeds to step S1504, in which the CPU 202 narrows down the 30 GIF contents to 13 icon contents. In step S308, since the maximum number of contents of the detail of content attribute 604 is 13, and the number of elements of PL[ ] is not 0, the process returns to step S304.

The above classification is continued until the maximum number of contents of Pselect becomes 1 or the number of elements of PL[ ] becomes 0 in step S308.

Figure 20:
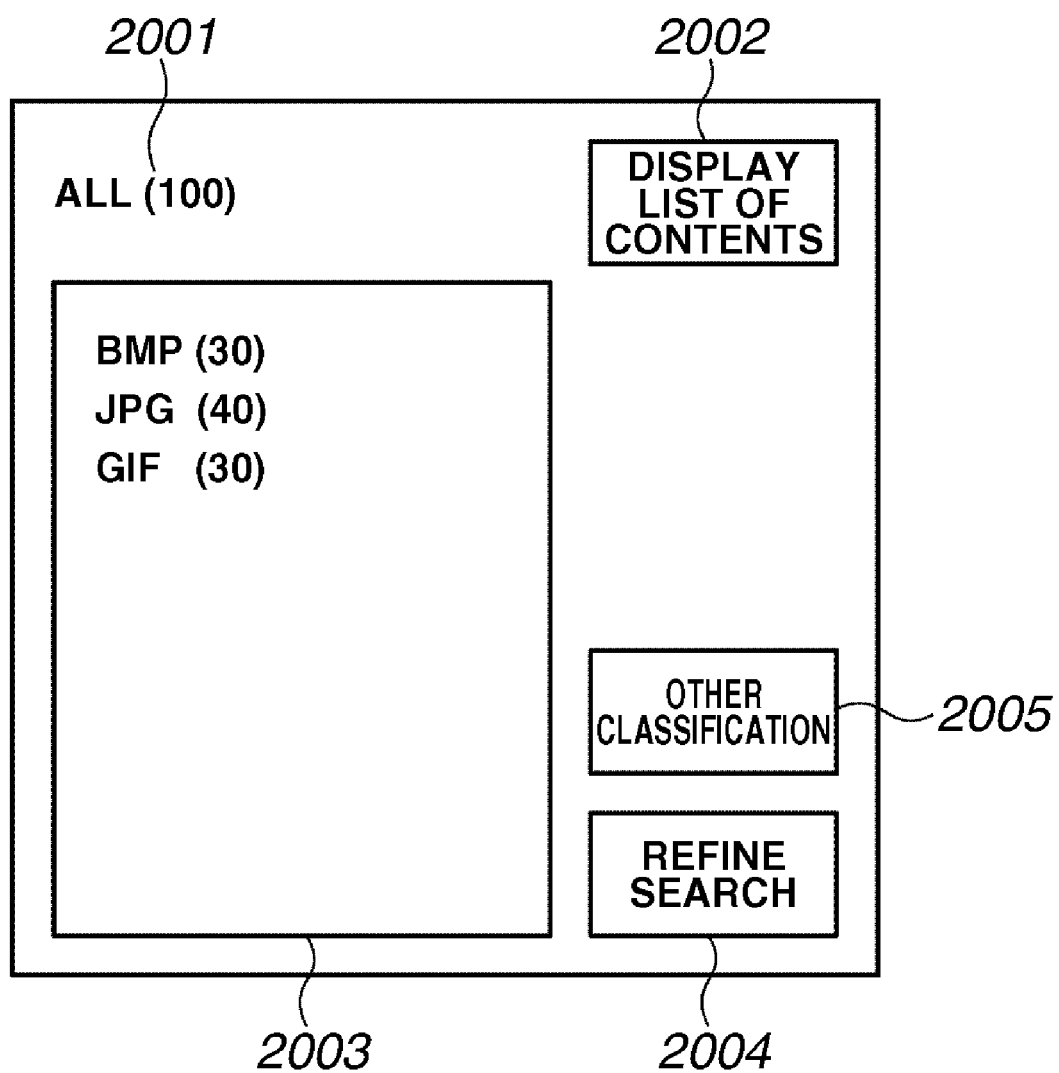
FIG. 20 illustrates an example of a content search refinement screen displayed on the display in FIG. 2.
Figure 21:
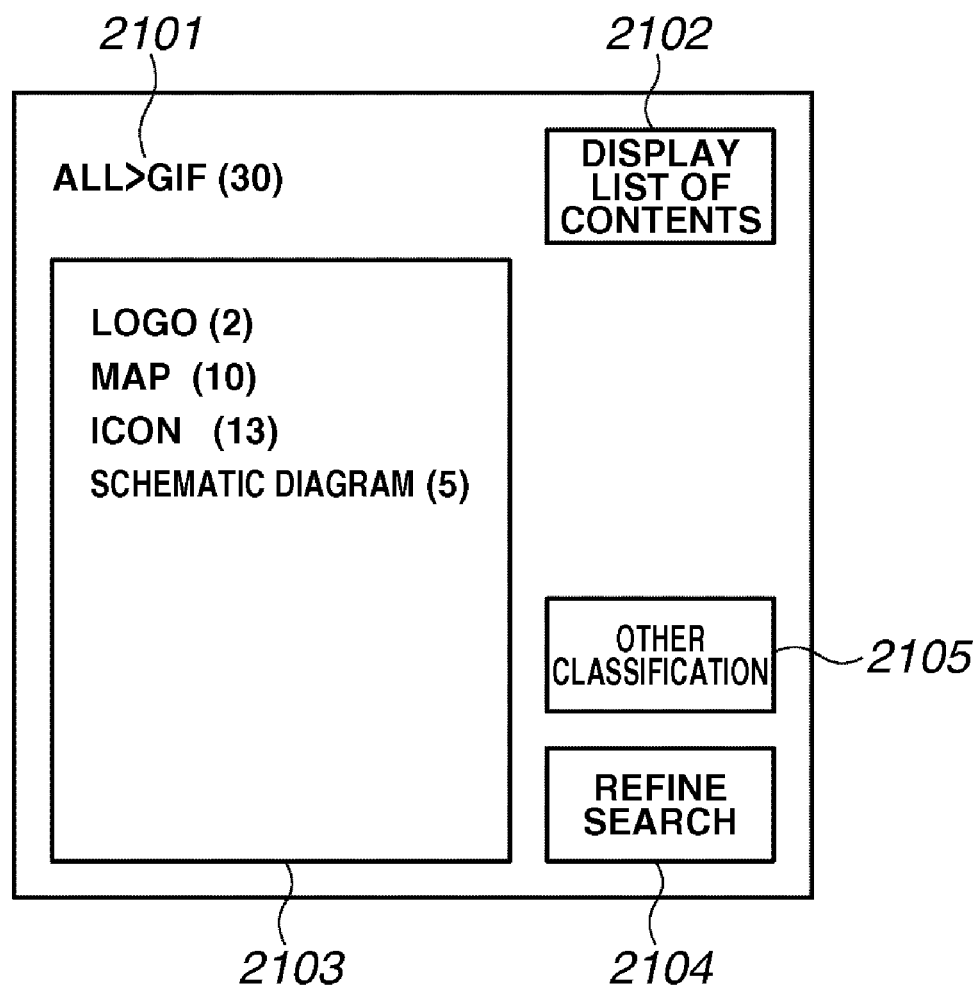
FIG. 21 illustrates an example of a content search refinement screen displayed on the display in FIG. 2.

FIG. 20, FIG. 21, FIG. 12, and FIG. 14 illustrate examples of screens displayed to the user in the second exemplary embodiment. In particular, FIG. 20 and FIG. 21 illustrate examples of a content search refinement screen displayed on the display 216. In this example, the screen is used by the user to refine search for a content from the 100 image contents classified by the above-described process.

In FIG. 20, a classification indicator 2001 indicates that the user can select from all of the 100 image contents. When the user presses a content list display button 2002, a list of the 100 image contents is displayed on the screen as shown in FIG. 12. An attribute value list 2003 is used by the user to refine search on the 100 contents. On this screen, the user can select from the attribute values of the file format attribute 601, i.e., BMP, JPG, and GIF. The number of contents of each attribute value is also shown.

A refine search button 2004 is used to refine search on the 100 contents. For example, when the user presses the refine search button 2004 while selecting GIF on the attribute value list 2003, the CPU 202 controls the display 216 to provide a screen for refining search on the 30 GIF contents as shown in FIG. 21.

An "other classification" button 2005 is used for changing the attribute in refining search. When the user does not select an attribute value from the attribute value list 2003, the user presses the "other classification" button 2005. The CPU 202 controls the display 216 to provide a screen for refining search by an attribute other than the file format attribute 601.

FIG. 21 illustrates an example of a screen on which the user refines search for the desired content from 30 GIF contents of the 100 image contents.

In FIG. 21, a classification indicator 2101 indicates that the user can select from the 30 GIF contents of the 100 image contents. When the user presses a content list display button 2102, the CPU 202 controls the display 216 to provide a screen displaying a list of the 30 GIF contents as shown in FIG. 14. An attribute value list 2103 is used by the user to refine search on the 30 GIF contents. In this example, the attribute values of the detail of content attribute 604, i.e., "logo", "map", "icon", and "schematic diagram" and the number of contents of each attribute value are shown.

A refine search button 2104 is also used for refining search on the 30 GIF contents. For example, when the user presses the refine search button 2104 while selecting "icon" in the attribute value list 2103, the CPU 202 controls the display 216 to provide a screen for refining search on the 13 icon contents of the 30 GIF contents.

An "other classification" button 2105 is used for changing the attribute in refining search. When the user does not select an attribute value from the attribute value list 2103, the user presses the "other classification" button 2105. The CPU 202 controls the display 216 to provide a screen for refining search by an attribute other than the detail of content attribute 604.

FIG. 12 and FIG. 14 are similar to those in the first exemplary embodiment, and, therefore, a detailed description is omitted. However, there are the following differences between the first and second exemplary embodiments. In the second exemplary embodiment, when the back button 1204 in FIG. 12 is pressed, the CPU 202 controls the display 216 to provide a screen for refining search on the contents as shown in FIG. 20. In addition, in the second exemplary embodiment, when the back button 1404 in FIG. 14 is pressed, a screen for refining search on contents as shown in FIG. 21 is displayed.

As described above, in the second exemplary embodiment, the CPU 202 stores the priority value set on each attribute in the hard disk 210. According to the procedures shown in FIG. 3, FIG. 15, and FIG. 16, the CPU 202 calculates the classification cost based on the number of contents classified by each attribute and the corresponding priority values (e.g., in step S1501 in FIG. 15). The CPU 202 checks the classification cost of contents classified by each attribute and determines the attribute to be the criterion for classifying the contents in step S1605 of FIG. 16.

According to the second exemplary embodiment, a user can access the desired content efficiently without unnecessary switching or scrolling of the screen. The CPU 202 determines the attribute to be the classification criterion sequentially according to the status of the search refinement. Consequently, search refinement is performed more efficiently as compared to the first exemplary embodiment.

In addition, in the case where a user does not know the attribute value of the attribute which is the classification criterion, the user can change the attribute to be the classification criterion. Furthermore, a user can make a setting so that the attribute desired by the user can receive higher priority in being chosen as the classification criterion.

Third Exemplary Embodiment

In the first and second exemplary embodiments, contents are classified by only one attribute at a time. In the third exemplary embodiment, contents are classified by a composite attribute in which a plurality of attributes is combined, as described below. Since the system configuration of the third exemplary embodiment is similar to that shown in FIG. 1 and FIG. 2 in the first exemplary embodiment, a further description thereof is not repeated here.

Figure 22:
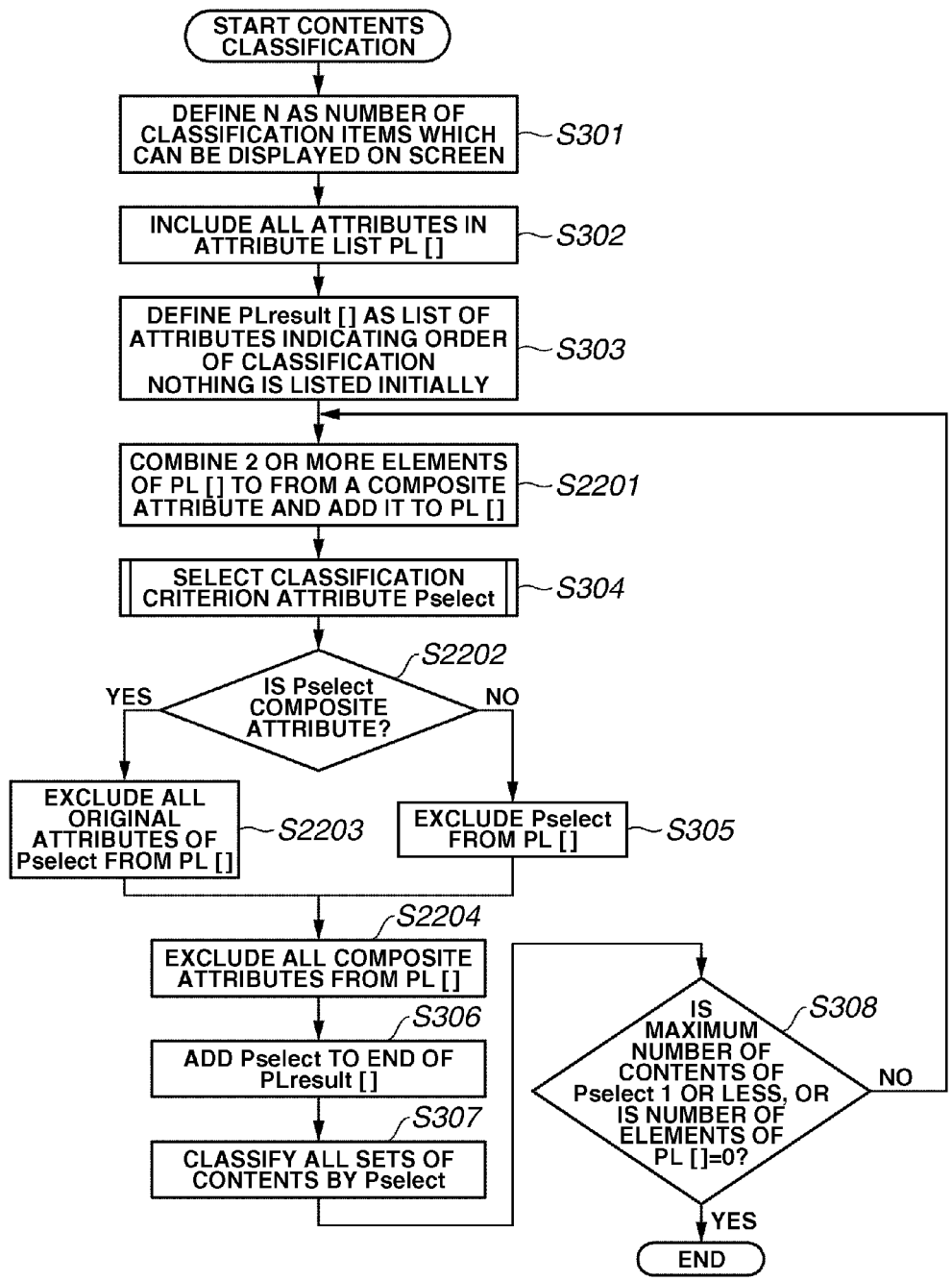
FIG. 22 is a flowchart illustrating an example of a data processing procedure in the information processing apparatus according to an exemplary embodiment of the present invention.

FIG. 22, FIG. 4, and FIG. 5 are flowcharts of the processes performed in the third exemplary embodiment.

FIG. 22 is a flowchart of a data processing procedure, which is the procedure of contents classification, of the information processing apparatus according to an exemplary embodiment of the present invention. The CPU 202 loads control programs from the hard disk 210 and executes the programs to realize each of the steps. Since steps S301 to S303 and S304 to S308 are similar to those in FIG. 3, a description of these steps will not be repeated. Steps S2201 and S2202 to S2204 will be described below.

In step S2201, the CPU 202 combines two or more of the elements of PL[ ] to form a composite attribute and adds the composite attribute to PL[ ]. In step S2202, the CPU 202 determines whether Pselect is the composite attribute added to PL[ ]. In the case that the CPU 202 determines that Pselect is the composite attribute, in step S2203, the CPU 202 excludes the original attributes that were combined to form the composite attribute from PL[ ]. In step S2204, the CPU 202 excludes all composite attributes from PL[ ]. The process then proceeds to step S306. On the other hand, in step S2202, in the case where the CPU 202 determines that Pselect is not the composite attribute formed in step S2201, the process proceeds to step S305.

The processes in FIG. 4 and FIG. 5 are similar to those in the first exemplary embodiment, and, therefore, a description thereof will not be repeated.

Figures 23, 24:
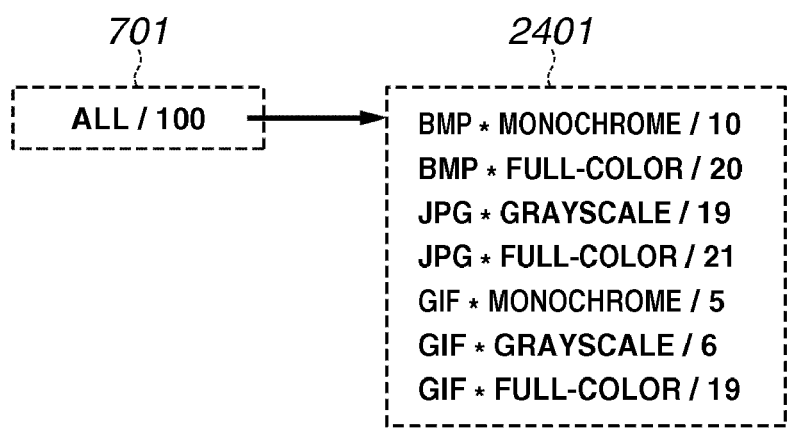
FIG. 23 illustrates an example of a management table of contents classified by each attribute in the information processing apparatus according to an exemplary embodiment of the present invention.
FIG. 24 illustrates an example of a set of contents searched by the information processing apparatus according to an exemplary embodiment of the present invention.

FIG. 6, FIG. 23, and FIG. 24 are data for use in the third exemplary embodiment. A plurality of attributes are set based on the 100 image contents stored in the hard disk 210, and the contents are classified by each attribute value associated with a content for every attribute. Since the number of contents of each attribute value and the maximum number of contents and the number of classifications of each attribute are similar to those in the first embodiment, a description thereof will not be repeated.

A case where the process shown in FIG. 22, FIG. 4, and FIG. 5 is applied to the 100 image contents as shown in FIG. 6 is described below.

In this example, the maximum number of classification items that can be displayed on the screen is 10. Thus, N in steps S301 in FIG. 22 becomes 10. In step S302, the elements of PL[ ] are the file format attribute 601, color description attribute 602, creator attribute 603, and detail of content attribute 604. In step S303, PL result[ ] is an empty list.

In step S2201, the CPU 202 combines two or more of the elements of PL[ ] to form a composite attribute and stores the composite attribute in the PMEM 203. In the present exemplary embodiment, the composite attribute is an attribute which has a combination of attribute values of the two or more attributes that are combined, and the number of classifications is N or less.

FIG. 23 illustrates an example of a management table of contents by attribute in the information process apparatus according to an exemplary embodiment of the present invention. In this example, the file format attribute 601 is combined with one or more of the color description attribute 602, creator attribute 603, and detail of content attribute 604 to form a composite attribute. In FIG. 23, two composite attributes, i.e., file format*color description attribute 2301, and file format*creator attribute 2302, are shown.

The file format*color description attribute 2301 is formed by combining the file format attribute 601 and the color description attribute 602. The file format*color description attribute 2301 does not have an attribute value of BMP*grayscale since there is no content whose file format is BMP and whose color description is grayscale. The File format*creator attribute 2302 is a composite attribute formed by combining the file format attribute 601 and the creator attribute 603. The two composite attributes 2301 and 2302 are added to PL[ ].

In step S304 of FIG. 3, the process proceeds to the process in FIG. 4. The CPU 202 repeats the process of step S403 6 times, or by the number of elements of PL[ ], and counts the number of classifications and the maximum number of contents for the attributes 601, 602, and 603. The process proceeds to that in FIG. 5, and the CPU 202 counts the number of classifications and the maximum number of contents for the detail of content attribute 604, the file format*color description composite attribute 2301, and the file format*creator composite attribute 2302.

In step S501, since the contents are not yet classified, the process proceeds to step S502. In step S502, the CPU 202 counts the maximum number of contents 606, the maximum number of contents 2303 (i.e., the maximum number of contents of the composite attribute), the number of classifications 607, and the number of classifications 2304 (i.e., the number of classifications of the composite attribute).

The process then returns to that in FIG. 4. In step S405, the attributes 601, 602, and 603 whose numbers of classification are between 2 and N are defined as the elements of PLc[ ]. In step S405, since the number of elements of PLc[ ] is not 0, the process proceeds to step S407. In step S407, the attribute in PLc[ ] whose maximum number of contents (21 contents) is smallest, i.e., the file format*color description composite attribute 2301, becomes Pselect. The process then returns to that in FIG. 22. In step S2202, since Pselect is the composite attribute 2301, the process proceeds to step S2203.

In step S2203, the CPU 202 excludes the file format attribute 601 and the color description attribute 602, which were combined to form the file format*color description composite attribute 2301, from PL[ ]. As a result, the elements of PL[ ] become the creator attribute 603, the detail of content attribute 604, the file format*color description composite attribute 2301, and the file format*creator composite attribute 2302. In step S2204, the CPU 202 excludes the composite attributes 2301 and 2302 from PL[ ]. Thus, the elements of PL[ ] become the attributes 603 and 604. In step S306, the CPU 202 adds the file format*color description composite attribute 2301 to the end of PLresult[ ]. Thus, the element of PLresult[ ] becomes the composite attribute 2301.

FIG. 24 illustrates an example of the set of contents to be searched by the information processing apparatus according to an exemplary embodiment of the present invention. In step S307, the CPU 202 classifies the 100 image contents 701, which is originally the set of contents, into 7 sets 2401 by the file format*color description composite attribute 2301. As shown in FIG. 24, the 100 contents are classified into 10 BMP*monochrome contents, 20 BMP*full-color contents, 19 JPG*grayscale contents, 21 JPG*full-color contents, 5 GIF*monochrome contents, 6 GIF*grayscale contents, and 19 GIF*full-color contents.

In step S308, the maximum number of contents of the file format attribute 601 is 21, and the number of elements of PL[ ] is not 0. Accordingly, the process proceeds to step S2201.

The classification process described above is continued until the maximum number of contents of Pselect becomes 1 or the number of elements of PL[ ] becomes 0 in step S308.

Figure 25:
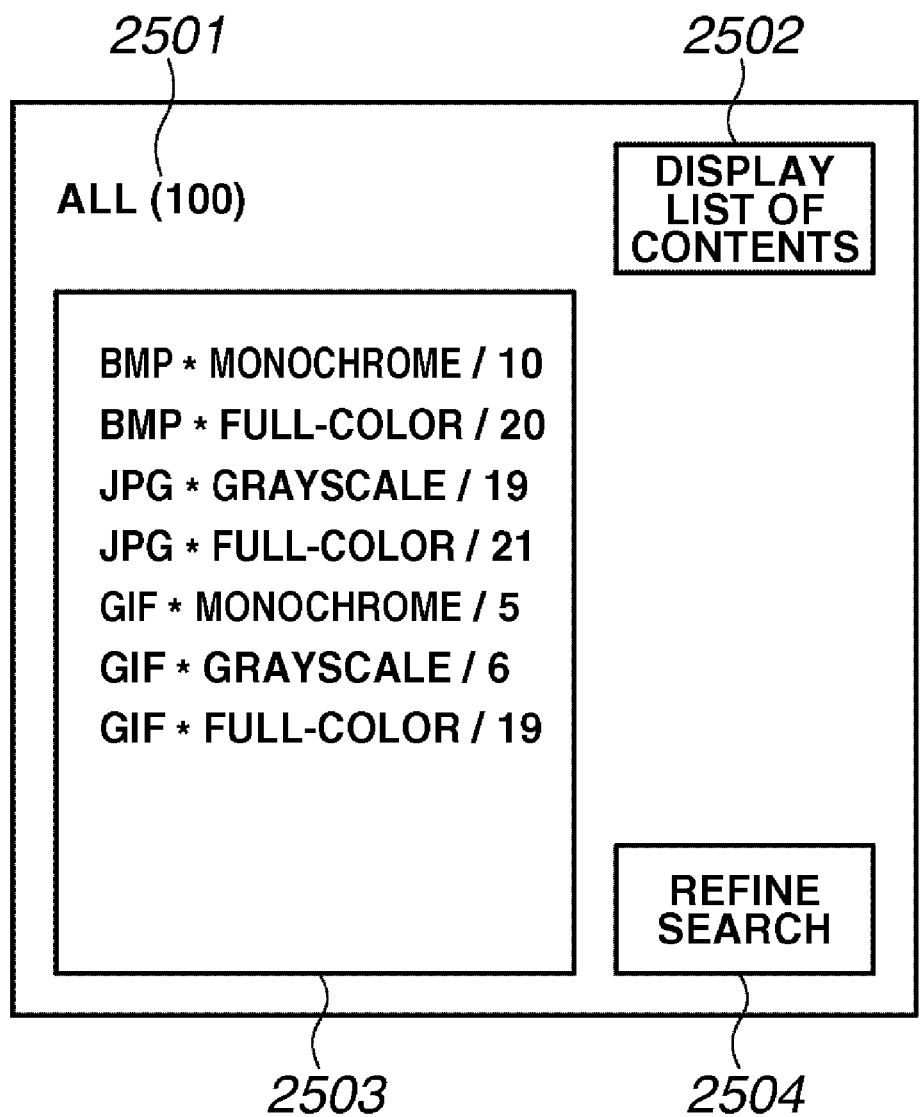
FIG. 25 illustrates an example of a content search refinement screen displayed on the display in FIG. 2.

FIG. 25 illustrates an example of a search refinement screen on the display 216. In this example, a user refines search on the 100 image contents classified according to the process shown in FIG. 22.

In FIG. 25, a classification indicator 2501 indicates that the user can select from all of the 100 image contents. When the user presses a content list display button 2502, the CPU 202 controls the display 216 to provide a screen displaying the 100 contents such as is shown in FIG. 12. The user can select an attribute value from an attribute value list 2503 to refine search on the 100 image contents. In this example, the attribute values of the file format*color description composite attribute 2301 and the number of contents of each attribute value are displayed. More specifically, the attribute value list 2503 indicates 10 BMP*monochrome contents, 20 BMP*full-color contents, 19 JPG*grayscale contents, 21 JPG*full-color contents, 5 GIF*monochrome contents, 6 GIF*grayscale contents, and 19 GIF*full-color contents.

A refine search button 2504 is used to refine search on the 100 contents. For example, when the user presses the refine search button 2504 while selecting GIF*full-color on the attribute value list 2503, the search refinement screen in which 19 GIF*full-color contents are listed for selection is displayed.

FIG. 12 is similar to that in the first exemplary embodiment, and, therefore, a detailed description thereof will not be repeated. However, in the third exemplary embodiment, when the back button 1204 is pressed, the screen shown in FIG. 25 is displayed instead of that shown in FIG. 11 as in the first exemplary embodiment.

As described above, in the third exemplary embodiment, the CPU 202 stores composite attributes, formed by combining a plurality of attributes, in the hard disk 210. According to the procedures of FIG. 3, FIG. 15, and FIG. 22, the CPU 202 counts the number of registered contents classified by each composite attribute for every attribute and determines the attribute to be the criterion for classifying the contents.

According to the third exemplary embodiment, two or more classification processes become a single process by introducing a composite attribute. As a result, the user can access the desired content more efficiently without unnecessary switching or scrolling of the screen as compared to the first exemplary embodiment. In addition, a content manager can classify contents automatically so as to refine a search more efficiently as compared to the first exemplary embodiment.

Fourth Exemplary Embodiment

The configuration of software (e.g., programs) that can be read by an information processing apparatus according to an exemplary embodiment of the present invention will be described below. FIG. 26 illustrates a memory map of a storage medium storing the various software. In addition, although not shown, information for managing software stored in the storage medium, e.g., version or creator, and information relying on an operating system of a computer for reading out the software (e.g., programs, icon for identifying the programs, etc.) can be stored in the storage medium.

Furthermore, data ancillary to the various programs is managed in directories of the storage medium. In addition, programs for installing the various programs in computers or for decompressing compressed programs can be stored in the storage medium.

The functions illustrated in FIG. 3 to FIG. 5, FIG. 15, FIG. 16, and FIG. 22 can be implemented by a host computer executing a program installed from an outside source. A group of information including a program can be supplied to an information processing apparatus from a storage device such as a compact disk-read-only memory (CD-ROM), flash memory, or floppy disk, or from an external storage device through a network.

A storage medium which stores software (program code) for realizing the operations of the above-described exemplary embodiments can be supplied to a system or an apparatus. Operating the various devices according to the program stored in the computer (CPU or micro-processing unit (MPU)) of the system or the apparatus is also included in the scope of the present invention.

Additionally, in the above case, the software (program code) itself realizes the operations of the embodiments. Such programs can take any form, for example, object code, a program executed by an interpreter, or script data supplied to an OS. The storage medium can be, for example, a flexible disk, hard disk, optical disk, magnetic optical disk, CD-ROM, magnetic tape, nonvolatile memory card, ROM, or digital versatile disk (DVD).

Such programs can also be supplied by the system or the apparatus accessing a web page on the Internet through the browser of a client computer. The program itself or a compressed file including an auto-install function can be downloaded from the web page onto a hard disk. In addition, the program code can be broken up into a plurality of files, and each file can be downloaded from different web pages.

Furthermore, such program code can be encrypted and stored in a storage medium such as a CD-ROM to be distributed to users. A user who meets the predetermined conditions can download the key information for decrypting the program from a web page through the Internet. By using the key information, the encrypted program can be executed and be installed in a computer to realize the functions of the present invention.

Furthermore, the program code supplied to the computer can realize the operations of the above-described exemplary embodiments in collaboration with an operating system (OS) or other application software running on the computer.

Furthermore, the supplied program code can be stored in a memory equipped in a function enhancement board of the computer or a function enhancement unit connected to the computer, and a CPU in the function enhancement board or the function enhancement unit can executes all or part of the processing based on the instructions of the program code to realize the operations of the embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-328482 filed Nov. 14, 2005, which is hereby incorporated by reference herein in its entirety.

What is claimed is:

1. An information processing apparatus configured to classify a plurality of contents to which a plurality of attributes is set, the information processing apparatus comprising:
   a storage unit configured to store the plurality of contents, each of the contents having the plurality of attributes;
   a first classification unit configured to count, for each of the attributes, number of classifications and number of contents of each classification when the plurality of contents stored in the storage unit is classified by each of the attributes; and
   a first determining unit configured to determine which of the attributes is used as a criterion for classifying the plurality of contents based on the number of classifications and the number of contents counted by the first classification unit, wherein the first determining unit determines, as the criterion, an attribute whose maximum number of contents is smallest;
   wherein the first determining unit determines, as the criterion for classifying the plurality of contents, an attribute whose maximum number of contents is smallest from the attributes whose number of classifications are between 2 and the upper limit set by the setting unit when there is at least one attribute whose number of classifications are between 2 and the upper limit; and
   wherein the first determining unit determines, as the criterion for classifying the plurality of contents, an attribute whose number of classifications is 2 or more and is smallest when there is no attribute whose number of classifications are between 2 and the upper limit.

2. The information processing apparatus according to claim 1, further comprising:
   a first display control unit configured to display, on a display unit, a list of attribute values of the attribute determined by the first determining unit;
   a selecting unit configured to allow a user to select an attribute value to be used in refining search from the list of attribute values displayed by the first display control unit; and
   a search refinement unit configured to refine search on contents based on the attribute value selected by the selecting unit.

3. The information processing apparatus according to claim 1, further comprising:
   a second classification unit configured to count, for each of the attributes other than the attribute determined by the first determining unit, number of classifications and number of contents of each classification when a result of classification using the attribute determined by the first determining unit is further classified by each of the attributes other than the attribute determined by the first determining unit; and
   a second determining unit configured to determine which of the attributes is used as a subsequent criterion for classifying contents based on the number of classifications and the number of contents counted by the second classification unit.

4. The information processing apparatus according to claim 1, further comprising a priority storage unit configured to store priority of each attribute,
   wherein the first determining unit is configured to determine which of the attributes is used as a criterion for classifying the plurality of contents based on the priority, the number of classifications, and the number of contents.

5. The information processing apparatus according to claim 1, further comprising a composite attribute storage unit configured to store a composite attribute created by combining a plurality of attributes that are set to a plurality of contents,
   wherein the first classification unit is configured to count, for each of the composite attributes, number of classifications and number of contents when the plurality of contents are classified by each composite attribute stored in the composite attribute storage unit, and
   wherein the first determining unit is configured to determine which of the composite attributes is used as a criterion for classifying the plurality of contents based on the number of classifications and the number of contents counted for each composite attribute by the first classification unit.

6. The information processing apparatus according to claim 1, wherein the setting unit sets the upper limit based on number of classification items that can be displayed on a screen at once.

7. An information processing method for classifying a plurality of contents stored in a storage unit, each of the contents having a plurality of attributes, the method comprising:
   a first classification step of counting, for each of the attributes, number of classifications and number of contents of each classification when the plurality of contents stored in the storage unit is classified by each of the attributes; and
   a first determining step of determining which of the attributes is used as a criterion for classifying the plurality of contents based on the number of classifications and the number of contents counted in the first classification step, wherein the first determining step determines, as the criterion, an attribute whose maximum number of contents is smallest;

wherein it is determined in the first determining step which of attributes is used as a criterion for classifying the plurality of contents based on the upper limit set and the number of classifications and the number of contents counted as the criterion for classifying the plurality of contents, an attribute whose maximum number of contents is smallest from the attributes whose number of classifications are between 2 and the upper limit set by the setting unit when there is at least one attribute whose number of classifications are between 2 and the upper limit; and wherein it is determined in the first determining step, as the criterion for classifying the plurality of contents, an attribute whose number of classifications is 2 or more and is smallest when there is no attribute whose number of classifications are between 2 and the upper limit.

8. The information processing method according to claim 7, further comprising:

a display controlling step of displaying, on a display unit, a list of attribute values of the attribute determined;

a selecting step of allowing a user to select an attribute value to be used in refining search from the list of attribute values displayed; and a search refinement step of refining search on contents based on the attribute value selected in the selected step.

9. The information processing method according to claim 7, further comprising:

a second classification step of counting, for each of the attribute other than the attribute determined in said first determining step, number of classifications and number of contents of each classification when a result of classification using the attribute determined in the first determining step is further classified by each of the attributes other than the attribute determined in the first determining step; and a second determining step of determining which of the attributes is used as a subsequent criterion for classifying contents based on the number of classifications and the number of contents counted in the second classification step.

10. The information processing method according to claim 7, further comprising storing priority of each attribute, wherein it is determined in the first determining step which of the attributes is used as a criterion for classifying the plurality of contents based on the priority, the number of classifications, and the number of contents.

11. The information processing method according to claim 7, further comprising storing a composite attribute created by combining a plurality of attributes that are set to a plurality of contents, wherein the number of classifications and the number of contents are counted for each of the composite attributes in the first classification step when the plurality of contents are classified by each composite attribute stored, and wherein it is determined in the first determining step which of the composite attributes is used as a criterion for classifying the plurality of contents based on the number of classifications and the number of contents counted for each composite attribute in the first classification step.

12. The information processing method according to claim 7, wherein the upper limit is set based on number of classification items that can be displayed on a screen at once.

13. A computer-readable storage medium storing a program for causing a computer to execute an information processing method for classifying a plurality of contents stored in a storage unit, each of the contents having a plurality of attributes, the method comprising:

a first classification step of counting, for each of the attributes, number of classifications and number of contents of each classification when the plurality of contents stored in the storage unit is classified by each of the attributes; and a first determining step of determining which of the attributes is used as a criterion for classifying the plurality of contents based on the number of classifications and the number of contents counted in the first classification step, wherein it is determined in the first determining step, as a criterion, an attribute whose maximum number of contents is smallest;

wherein the first determining unit determines, as the criterion for classifying the plurality of contents, an attribute whose maximum number of contents is smallest from the attributes whose number of classifications are between 2 and the upper limit set by the setting unit when there is at least one attribute whose number of classifications are between 2 and the upper limit; and wherein the first determining unit determines, as the criterion for classifying the plurality of contents, an attribute whose number of classifications is 2 or more and is smallest when there is no attribute whose number of classifications are between 2 and the upper limit.

* * * * *